United States Patent
Doshi

(10) Patent No.: US 10,908,919 B2
(45) Date of Patent: *Feb. 2, 2021

(54) BOOTING AND POWER MANAGEMENT BY COORDINATING OPERATIONS BETWEEN PROCESSORS

(71) Applicant: Apple Inc., Cupertino, CA (US)

(72) Inventor: Hardik K. Doshi, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/290,566

(22) Filed: Mar. 1, 2019

(65) Prior Publication Data
US 2019/0250925 A1    Aug. 15, 2019

Related U.S. Application Data

(63) Continuation of application No. 15/285,202, filed on Oct. 4, 2016, now Pat. No. 10,223,128.

(60) Provisional application No. 62/398,988, filed on Sep. 23, 2016.

(51) Int. Cl.
| | | |
|---|---|---|
| G06F 9/00 | (2006.01) | |
| G06F 15/177 | (2006.01) | |
| G06F 9/4401 | (2018.01) | |
| G06F 1/3287 | (2019.01) | |
| G06F 1/3203 | (2019.01) | |
| G06F 1/3293 | (2019.01) | |

(52) U.S. Cl.
CPC .......... *G06F 9/4405* (2013.01); *G06F 1/3203* (2013.01); *G06F 1/3287* (2013.01); *G06F 1/3293* (2013.01); *G06F 9/442* (2013.01); *G06F 9/4418* (2013.01); *Y02D 10/00* (2018.01)

(58) Field of Classification Search
CPC combination set(s) only.
See application file for complete search history.

(56) References Cited

U.S. PATENT DOCUMENTS

| | | |
|---|---|---|
| 5,181,029 A | 1/1993 | Kim |
| 5,387,042 A | 2/1995 | Brown |
| 5,644,737 A | 7/1997 | Tuniman et al. |
| 5,867,729 A | 2/1999 | Swonk |
| 6,232,972 B1 | 5/2001 | Arcuri et al. |
| 7,620,905 B2 | 11/2009 | Boss et al. |

(Continued)

FOREIGN PATENT DOCUMENTS

WO    2015/112868 A1    7/2015

OTHER PUBLICATIONS

CSS Tutorial, CSS Position, W3Schools [online], 2016 [retrieved on Sep. 4, 2019], Retrieved from the Internet: <https://www.w3schools.com/css/css_positioning.asp> (Year 2016).

*Primary Examiner* — Nitin C Patel
(74) *Attorney, Agent, or Firm* — Invoke

(57) ABSTRACT

A computing device may comprise a first processor and a secondary processor. The first processor may initiate a power management process transitioning the first processor from a first state to a second state and, upon reaching a predetermined step in the power management process, notify the secondary processor of the power management process. The secondary processor may initiate, in response to the notifying, a parallel power management process transitioning the secondary processor from an equivalent first state to an equivalent second state.

20 Claims, 20 Drawing Sheets

(56) References Cited

U.S. PATENT DOCUMENTS

| | | |
|---|---|---|
| 7,802,206 B1 | 9/2010 | Davis et al. |
| 7,882,448 B2 | 2/2011 | Haug |
| 7,907,123 B2 | 3/2011 | Gil-Gomez |
| 8,140,993 B2 | 3/2012 | Balasubramanian |
| 8,321,810 B2 | 11/2012 | Heintze |
| 8,411,039 B2 | 4/2013 | Guo et al. |
| 8,819,585 B2 | 8/2014 | Sareen et al. |
| 9,904,437 B2 | 2/2018 | Costenaro et al. |
| 2002/0063691 A1 | 5/2002 | Rogers et al. |
| 2002/0191029 A1 | 12/2002 | Gillespie et al. |
| 2004/0021681 A1 | 2/2004 | Liao |
| 2004/0257335 A1 | 12/2004 | Numano |
| 2006/0123353 A1 | 6/2006 | Matthews et al. |
| 2006/0190838 A1 | 8/2006 | Nadamoto |
| 2006/0224989 A1 | 10/2006 | Pettiross et al. |
| 2007/0180398 A1 | 8/2007 | McArdle |
| 2008/0046100 A1 | 2/2008 | Balasubramanian |
| 2008/0082937 A1 | 4/2008 | Bennah et al. |
| 2008/0225006 A1 | 9/2008 | Ennadi |
| 2009/0271604 A1* | 10/2009 | Jang ............... G06F 9/4416 713/2 |
| 2009/0315867 A1 | 12/2009 | Sakamoto et al. |
| 2010/0107123 A1 | 4/2010 | Sareen et al. |
| 2010/0265183 A1 | 10/2010 | Mail et al. |
| 2010/0313156 A1 | 12/2010 | Louch et al. |
| 2011/0047459 A1 | 2/2011 | Van Der Westhuizen |
| 2011/0055541 A1 | 3/2011 | Lee et al. |
| 2011/0131532 A1 | 6/2011 | Russell et al. |
| 2011/0307810 A1 | 12/2011 | Hilerio et al. |
| 2011/0307880 A1 | 12/2011 | Hilerio et al. |
| 2011/0310030 A1 | 12/2011 | Mundt et al. |
| 2012/0054778 A1 | 3/2012 | Russell et al. |
| 2012/0110497 A1 | 5/2012 | Gimpl et al. |
| 2012/0131495 A1 | 5/2012 | Goossens et al. |
| 2013/0076591 A1 | 3/2013 | Sirpal et al. |
| 2013/0104062 A1 | 4/2013 | Reeves et al. |
| 2013/0152007 A1 | 6/2013 | Costenaro et al. |
| 2013/0152015 A1 | 6/2013 | Costenaro et al. |
| 2013/0332869 A1 | 12/2013 | Ferry et al. |
| 2014/0089617 A1* | 3/2014 | Polzin ............... G06F 12/14 711/163 |
| 2014/0089650 A1 | 3/2014 | Polzin et al. |
| 2014/0149927 A1 | 5/2014 | Yoon |
| 2015/0074525 A1 | 3/2015 | Costenaro et al. |
| 2015/0112868 A1 | 4/2015 | Swamy et al. |
| 2015/0268927 A1 | 9/2015 | Stewart et al. |
| 2015/0370339 A1 | 12/2015 | Ligtenberg et al. |
| 2015/0378546 A1 | 12/2015 | Osborne et al. |
| 2017/0063962 A1 | 3/2017 | Padmanabhan et al. |
| 2017/0249072 A1 | 8/2017 | Martin et al. |
| 2017/0285894 A1 | 10/2017 | Barrus et al. |
| 2017/0322592 A1 | 11/2017 | Chen et al. |
| 2018/0088799 A1 | 3/2018 | Louch et al. |

* cited by examiner

BOOTING AND POWER MANAGEMENT BY COORDINATING OPERATIONS BETWEEN PROCESSORS

Each of the following applications are hereby incorporated by reference: application Ser. No. 15/285,202, filed Oct. 4, 2016; application No. 62/398,988, filed Sep. 23, 2016, which is hereby incorporated by reference herein in its entirety. The Applicant hereby rescinds any disclaimer of claim scope in the parent applications or the prosecution history thereof and advises the USPTO that the claims in this application may be broader than any claim in the parent applications.

TECHNICAL FIELD

The disclosure generally relates to booting and power management for a computing device.

BACKGROUND

Computing devices such as laptop computers, desktop computers, computer terminals, television systems, tablet computers, e-book readers, smart phones, smart watches, and wearable computers may be equipped with processors. Processors may run programs such as a device operating system and applications and may control and/or interact with other device components such as video cards, audio cards, input devices, memories, etc.

SUMMARY

Some computing devices may be equipped with multiple processors. The disclosed systems and methods may be used to coordinate booting and power management among the multiple processors. The example devices discussed herein include a main processor configured to perform many device functions, such as running a device operating system and applications, and a secondary processor configured to control certain hardware elements of the device, such as a camera and/or a dynamic function row (DFR). For example, a DFR may be a combined display and input device (e.g., a touchscreen) that can display a graphical user interface (GUI) and receive commands from user interaction with the GUI. The DFR may provide a virtual function key row that replaces the standard physical key function row available on most keyboards in some embodiments, or may be provided in addition to a function row in other embodiments. However, the disclosed systems and methods may be applicable to any device comprising multiple processors.

Particular implementations provide at least the following advantages: Boot processes and power mode transitions may be coordinated among multiple processors so that transitions happen synchronously. Coordination may be accomplished even for resource-constrained processors without their own boot image storage. Coordination may utilize high speed processor interconnects when appropriate and always-on communication systems and methods when the high speed interconnects are powered down (e.g., in a sleep mode). In the event of error in a secondary processor transition, main processor may troubleshoot.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Devices with Multiple Processors

Figure 1:
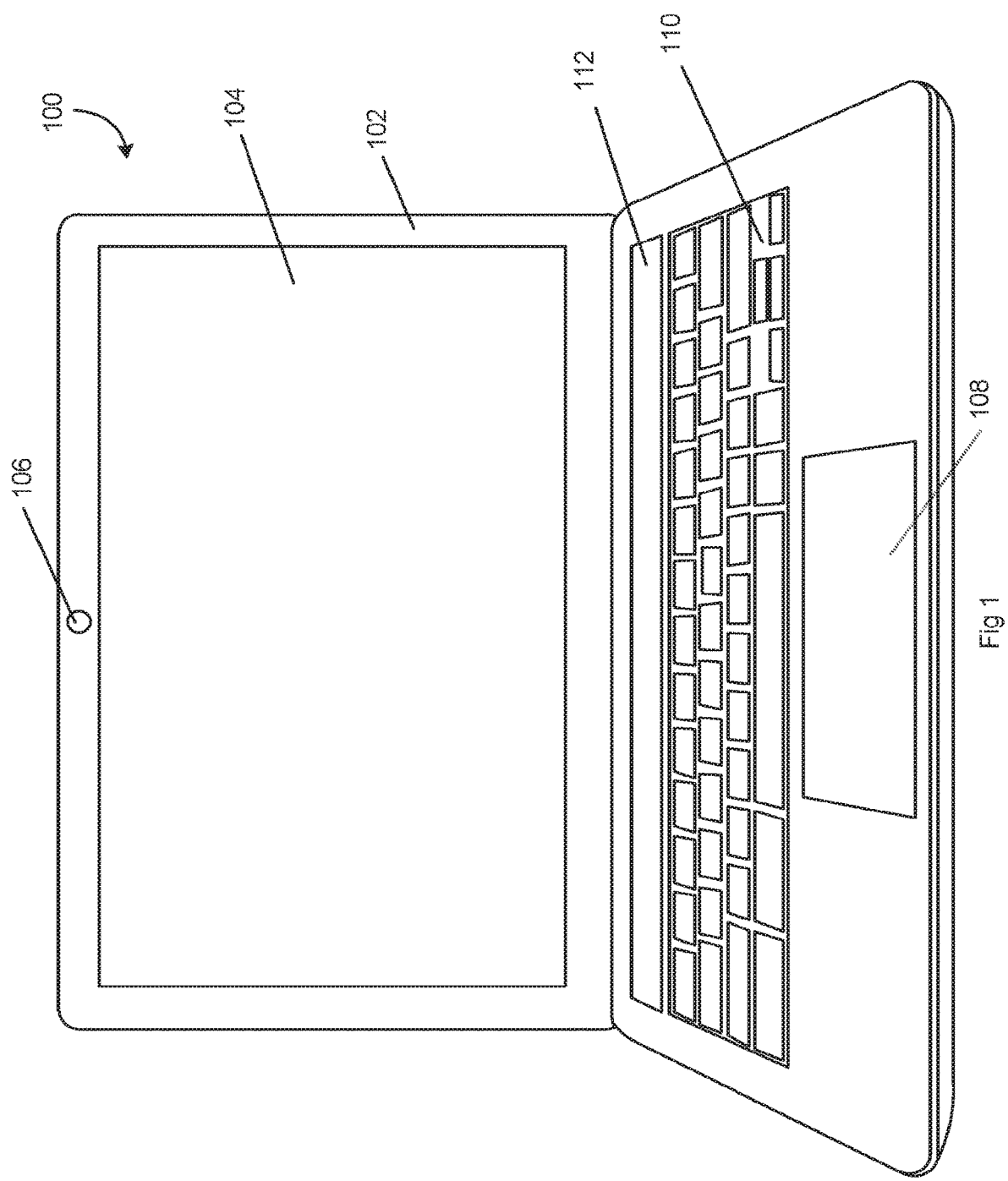
FIG. 1 is an example device comprising multiple processors.

FIG. 1 is an example device 100 comprising multiple processors. Representative device 100 is shown as a laptop computer, but device 100 may be one of a variety of electronic devices including, but not limited to, laptop computers, desktop computers, computer terminals, television systems, tablet computers, e-book readers, smart phones, smart watches, and wearable computers, for example. Device 100 may include case 102, main display 104, camera 106, touchpad 108, keyboard 110, and/or dynamic function row (DFR) 112. DFR 112 may include a touch sensitive display, display controller, touch input controller, and/or other hardware configured to display a graphical user interface (GUI) and receive commands from user interaction with the GUI. For example, the touch sensitive display may present graphical elements (e.g., virtual function keys) that can be selected by a user to invoke various functions of computing device 100 and/or the software (e.g., operating system, applications, etc.) running thereon.

In example device 100. DFR 112 is provided in place of a keyboard 110 function row and is positioned where a function row might normally be found on a standard keyboard layout. For example, some keyboards have a row of physical keys including an escape key, keys F1-F12, and/or additional keys, above physical number and letter keys. In some embodiments. DFR 112 may be located above physical number and letter keys in place of the physical key row including the escape key and keys F1-F12. In other embodiments, DFR 112 may be provided in addition to a keyboard 110 function row and/or may be located elsewhere on device 100 and/or may have different configurations and/or orientations from a row. For example, the DFR 112 may have a shape similar to a number-pad shaped rectangle or a vertical column. In addition, the DFR 112 may be composed of multiple displays that are physically separated (e.g., a DFR 112 comprising two distinct display areas that are physically separated).

Figure 2:
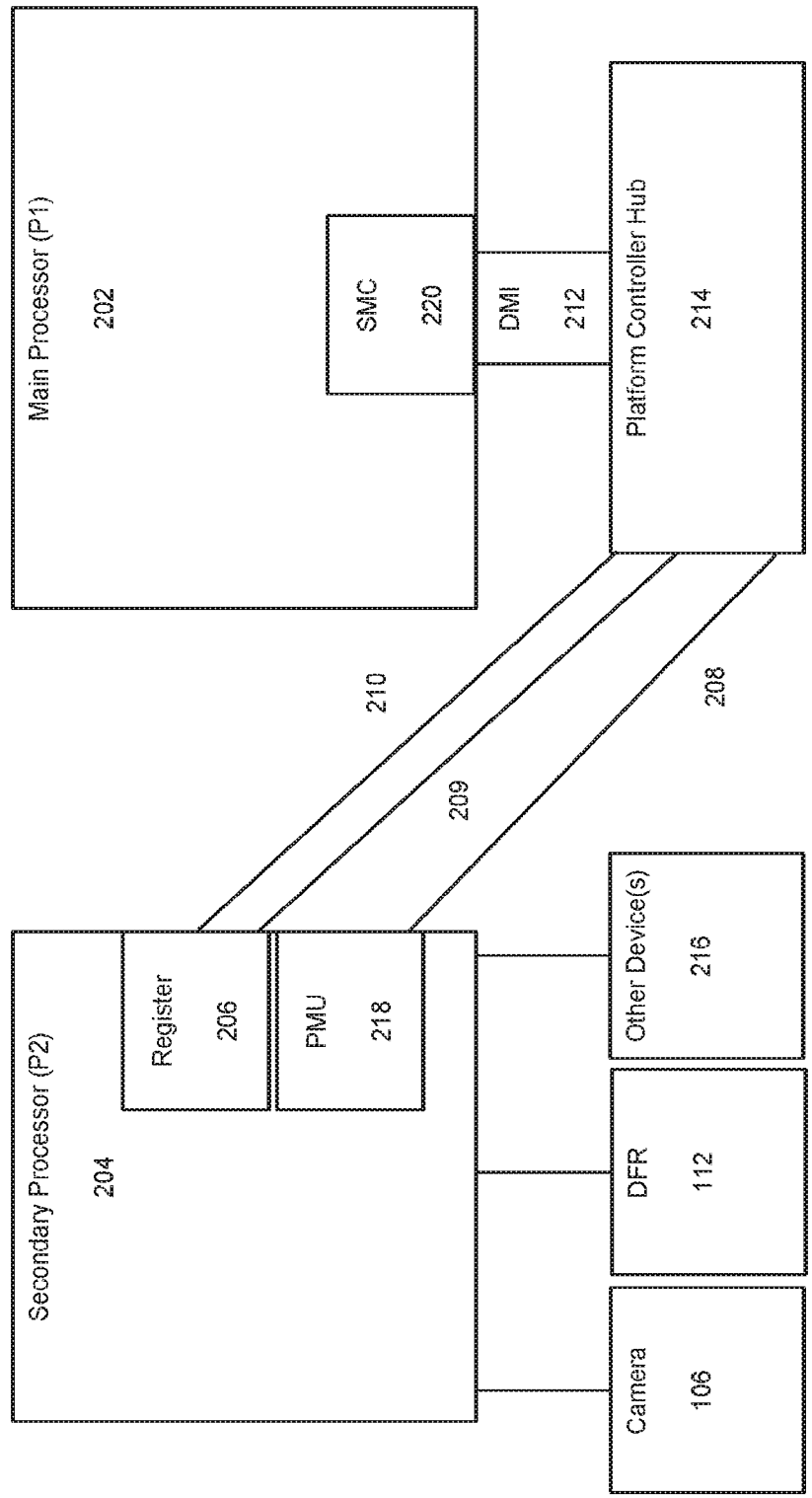
FIG. 2 is a block diagram showing multiple processors of an example device.

FIG. 2 is a block diagram of example hardware 200 for device 100. Device 100 may include main processor 202 (e.g., an X86 processor or other suitable processor). For example, main processor 202 may be an application processor that is configured to run the primary operating system of device 100 and/or any system or user applications executed on device 100. Main processor 202 may be coupled to platform controller hub 214 through bus 212 (e.g., front-side bus, hyper transport, quick path interconnect, direct media interface, or other bus) and, through platform controller hub 214, to other components of device 100 (e.g., video card, audio card, network card, memory, hard drive, input device(s), etc.). Main processor 202 may control general device 100 functionality, for example running an operating system (e.g., iOS, Windows, Linux, etc.) and applications. Main processor 202 may include system management control (SMC) 220 firmware configured to manage thermal regulation, power use, battery charging, video mode switching, sleep, standby, and other functions. SMC 220 may be active at all times while device 100 is powered on so that it can wake main processor 202 from sleep or standby modes, for example.

In some implementations, device 100 may include secondary processor 204. For example, secondary processor 204 can be a system on chip SoC, a coprocessor, an ARM processor, or the like. Secondary processor 204 may run an operating system different from the operating system operating on the main processor 202. For example, the secondary processor 204 may run an operating system such as iOS, watchOS, a real time operating system, an operating system for embedded systems, or a Linux variant. Secondary processor 204 may operate camera 106. DFR 112, and/or other device(s) 216 (e.g., touch identification sensor, ambient light sensor, etc.). Secondary processor 204 may include power management unit (PMU) 218 firmware configured to manage thermal regulation, power use, hardware power functions, sleep, standby, and other functions. PMU 218 may be active at all times while device 100 is powered on so that it can restore secondary processor 204 to a fully operational mode and/or allow secondary processor 204 to communicate with main processor 202 while main processor 202 is in a low power state, for example.

While main processor 202 may be coupled to memory storing boot data and/or other data, secondary processor 204 may be resource constrained. For example, secondary processor 204 can have a limited number of registers (including mailbox register 206 discussed below) and/or may have limited access to memory (e.g., a small amount of secure memory, such as a SPI NOR). The memory may store information for secondary processor 204 initialization after system 100 power up and/or secondary processor 204 restart, as discussed below.

In some implementations, main processor 202 and secondary processor 204 may communicate with one another through link 210. For example, link 210 can be a USB2 link or similar data link. For example, main processor 202 may generate images for display on DFR 112 and communicate them to secondary processor 204 over link 210, allowing secondary processor 204 to display the images on DFR 112. In some implementations, secondary processor 204 may receive touch inputs made to DFR 112 and communicate touch input data to main processor 202 over link 210, allowing main processor 202 to process the inputs.

In some implementations, main processor 202 and secondary processor 204 may communicate with one another through inter-integrated circuit (I²C) bus 209. Main processor 202 may use I²C bus 209 to place data in a memory register 206 ("mailbox") of secondary processor 204. Mailbox register 206 may serve as a PMU scratchpad where commands for PMU 218 are written by main processor 202. For example, main processor 202 may place data in memory register 206 to coordinate power state transitions between main processor 202 and secondary processor 204 when link 210 is inactive, as described in detail below. I²C bus 209 is presented as a specific example, but in some embodiments, main processor 202 may use other structures and/or protocols to place the data in memory register 206.

In some implementations, main processor 202 and secondary processor 204 may be coupled to one another through one or more general purpose input/output (GPIO) paths 208. Each GPIO path 208 may comprise a GPIO pin at main processor 202 and a GPIO pin at secondary processor 204 which may be coupled to one another. Each processor may be configured to set its respective GPIO pins as inputs or outputs. When a processor's pin is set as an output, the processor may drive the pin low (logic 0 or low voltage) or high (logic 1 or high voltage) and thereby send a data bit to the other processor. When a processor's pin is set as an input, the processor may detect when the voltage on the pin changes and perform processing in response. For example, main processor 202 may use GPIO paths 208 to trigger actions by secondary processor 204. Secondary processor 204 may use GPIO paths 208 to send acknowledgements to main processor 202. GPIO paths 208 are presented as a specific example, but in some embodiments, main processor 202 and secondary processor 204 may use other structures and/or protocols to communicate with one another.

In some implementations, main processor 202 may coordinate power state transitions with secondary processor 204. For example, main processor 202 can use link 210. I²C bus 209, and/or GPIO paths 208 to coordinate with secondary processor 204 to place secondary processor 204 in a power state corresponding to the power state of main processor 202. For example, when a user powers up device 100, main processor 202 and secondary processor 204 can coordinate the power states and can both boot up and enter a fully operational state. Likewise, when device 100 shuts down, main processor 202 and secondary processor 204 may both power down systems under their control and power themselves down.

In some implementations, main processor 202 may coordinate power state transitions with secondary processor 204 so that each processor is in a similar power usage mode. The respective power states may or may not be identical. For example, main processor 202 may be configured to be operable in a sleep state, but secondary processor 204 may not be so configured. If this is the case, when main processor 202 goes to sleep, secondary processor 204 may turn off all devices it controls (e.g., camera 106. DFR 112, etc.) to reduce power usage and prevent the devices from generating outputs that wake up main processor 202. Accordingly, in situations when the secondary processor 204 does not have an internal state equivalent to main processor 202 sleep state, secondary processor 204 has attenuated power usage under its control to correspond to the power-saving main processor 202 sleep state.

In some implementations, main processor 202 may bootstrap secondary processor 204 from startup and reset states. For example, since secondary processor 204 may not have enough memory to store a boot image and/or power state transition commands, main processor 202 may provide secondary processor 204 the boot image and/or power state transition commands necessary to boot or transition secondary processor 204. For example, during a boot process, boot commands for main processor 202 may instruct main processor 202 to send boot data to secondary processor 204 over link 210 (e.g., in 4 MB chunks or other suitably-sized increments). Main processor 202 may transfer boot data to secondary processor 204 while booting without affecting boot tasks of main processor 202, so that both processors may boot at the same time. At one or more points in the respective boot processes, main processor 202 may check on secondary processor 204 to determine whether secondary processor 204 is booting or has completed booting and, if not, may initiate recovery for (e.g., reboot) secondary processor 204.

In some situations, link 210 may be inactive. For example, link 210 can be inactive when main processor 202 is in a low power state such as sleep mode. In these situations, main processor 202 and secondary processor 204 may be unable to use link 210 for communication with one another. Accordingly, main processor 202 and secondary processor 204 may communicate using GPIO paths 208 and I$^2$C bus 209. Specifically, SMC 220 firmware coupled to main processor 202 and PMU 218 firmware coupled to secondary processor 204 may be active even during low power states. SMC 220 and PMU 218 may communicate using GPIO paths 208 and I$^2$C bus 209 when main processor 202 and/or secondary processor 204 are in low power states.

Main processor 202 and secondary processor 204 can coordinate power state transitions over GPIO paths 208 and I$^2$C bus 209. For example, main processor 202 may use I$^2$C bus 209 to deliver commands from main processor 202 to secondary processor 204. In some implementations, GPIO paths 208 may include multiple logical paths used to send alerts from main processor 202 to secondary processor 204 indicating the presence of the commands in mailbox register 206 and send acknowledgements from secondary processor 204 to main processor 202.

For example, GPIO paths 208 may include at least two logical GPIO paths (in some embodiments, at least two physical GPIO paths). GPIO paths 208 can include a first path for sending messages from main processor 202 to secondary processor 204. The first path can be referred to as a doorbell path. Main processor 202 may use the doorbell path to alert secondary processor 204 to the presence of commands (e.g., "doorbell messages") in mailbox register 206.

GPIO paths 208 can include a second path for sending messages, such as reply messages or confirmations of receiving doorbell messages, from secondary processor 204 to main processor 202 ("acknowledgement messages" or "ack messages"). The second path can be referred to as an ack path. Secondary processor 204 may use ack path to tell main processor 202 that secondary processor 204 has processed the commands in mailbox register 206.

I$^2$C bus 209 may constitute a third path from main processor 202 to secondary processor 204 to place data in register 206. The third path can be referred to as an SMC key path. Main processor 202 may use SMC key path to deliver commands ("SMC key") to secondary processor 204 mailbox register 206 for secondary processor 204 to execute.

An example communication sequence using the first, second, and third paths may proceed as follows. Main processor 202 may use SMC 220 to send a command to mailbox register 206 of secondary processor 204. Specifically, in some implementations. SMC 220 may send a command through I$^2$C bus 209 to write the command into mailbox register 206. Main processor 202 may send a doorbell message to secondary processor 204 by GPIO doorbell path 208 (e.g., a hardware pin). Secondary processor 204 may respond to the doorbell and then execute the command. After the command is executed, secondary processor 204 may send an ack back to main processor 202 to indicate that the command was received and executed.

In some implementations, main processor 202 can coordinate power state transitions with secondary processor 204. For example, main processor 202 may transition itself into and out of low power states (e.g., because it has access to software and/or firmware containing transition commands), but secondary processor 204 may need to be given commands in order to make similar transitions. To send such commands when link 210 is inactive, main processor (e.g., using SMC 220) 202 may send the commands by the third path to register 206. Main processor 202 may also send a wiggle interrupt (e.g., toggling a signal on GPIO path 208 from low to high or high to low) by the first path to instruct secondary processor 204 to check register 206. In response to detecting the interrupt, secondary processor (e.g., using PMU 218) may process the commands in register 206 and send ack by the second path. Main processor 202 may coordinate timing of power state transitions as described in detail below. For example, before entering a sleep state, main processor 202 may wait for confirmation to appear on the second path indicating that secondary processor 204 has powered down all affiliated components (e.g., camera 106, DFR 112, etc.).

Mailbox Communication Process

Figure 3:
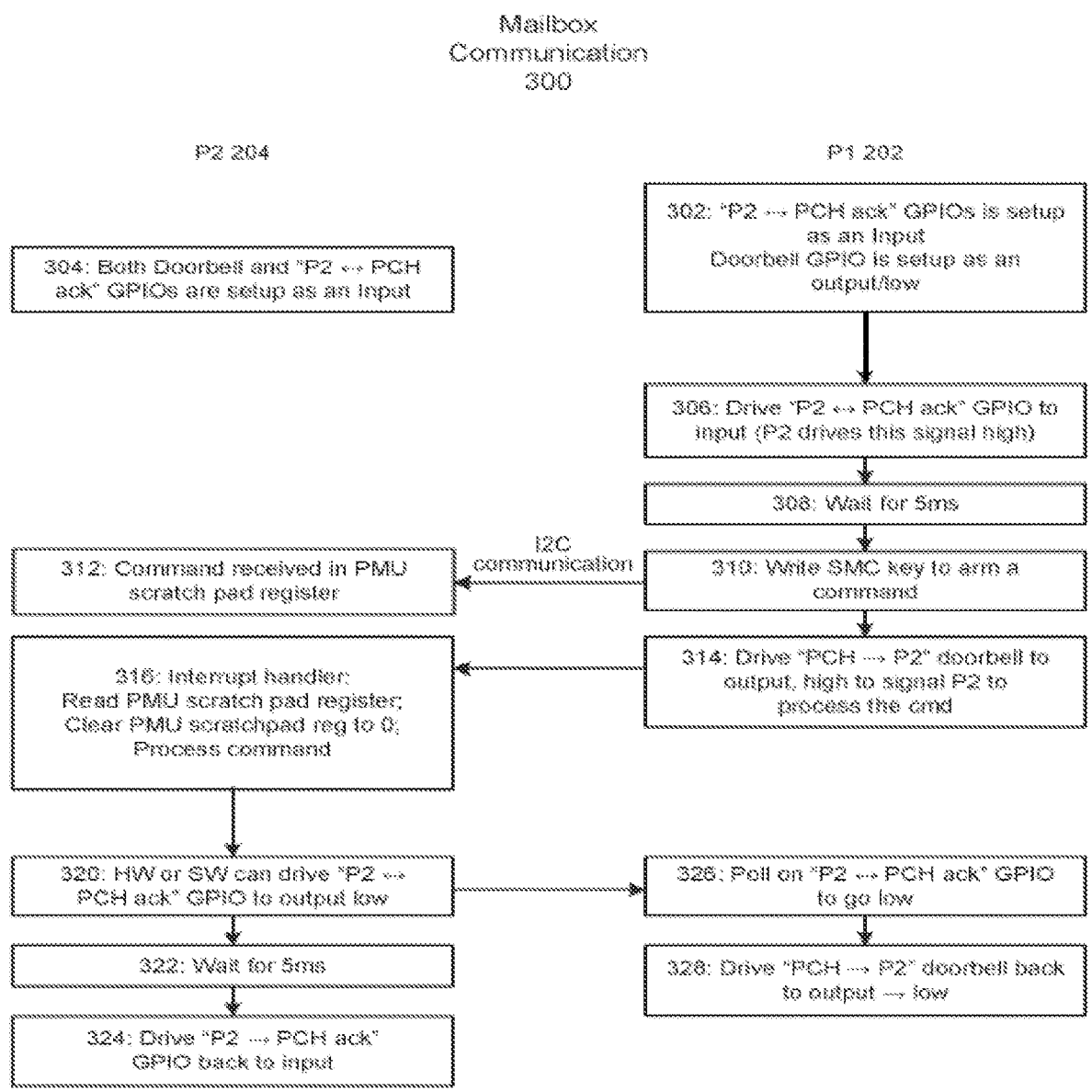
FIG. 3 shows an example mailbox communication process.

FIG. 3 shows an example mailbox communication process 300. Process 300 places information (e.g., commands to be executed/processed) in the mailbox register 206 so that secondary processor 204 can process the information in the mailbox. This process 300 may be performed as part of the power management processes described below to coordinate power state transitions of main processor 202 and secondary processor 204.

At step 302, main processor 202 may initialize GPIO paths 208. For example, main processor 202 can configure the main processor 202 ack GPIO 208 pin as an input data pin for receiving data from secondary processor 204. Main processor 202 can configure the main processor 202 doorbell GPIO 208 pin as an output data pin for sending data to secondary processor 204. This may establish data flow paths for future steps. For example, main processor 202 may send data using doorbell GPIO 208 as described below, so main processor 202 may set main processor 202 doorbell GPIO 208 pin as an output. Also, since secondary processor 204 may send data using ack GPIO 208, which main processor 202 may receive, main processor 202 may set main processor 202 ack GPIO 208 pin as an input to receive the communication from secondary processor 204.

At step 304, secondary processor 204 can initialize GPIO paths 208. For example, secondary processor 204 may set secondary processor 204 ack GPIO 208 pin and secondary processor 204 doorbell GPIO 208 pin as inputs from the perspective of secondary processor 204. In conjunction with main processor 202 actions at step 302, this may establish data flow paths for future steps. For example, main processor 202 may send data using doorbell GPIO 208, so secondary processor 204 may set secondary processor 204 doorbell GPIO pin 208 as an input. Note that even though secondary processor 204 may send data using ack GPIO 208, secondary processor 204 may initially set secondary processor 204 ack GPIO 208 pin as an input and wait for main processor 202 to allow secondary processor 204 to use ack GPIO 208 to send data.

At step 306, main processor 202 may prepare secondary processor 204 to send acknowledgements to main processor 202 using ack GPIO 208. For example, main processor 202 may drive ack GPIO 208 high. As described below, secondary processor 204 may acknowledge command processing by driving ack GPIO 208 low. Accordingly, by driving ack GPIO 208 high initially, main processor 202 can detect the change on ack GPIO 208 pin when secondary processor 204 drives ack GPIO 208 low. Herein, driving a pin high refers to driving the pin to logic 1, and driving a pin low refers to driving the pin to logic 0. However, other embodiments may reverse the arrangement (e.g., pins may be driven to logic 0 (low) where "high" is indicated herein and logic 1 (high) where "low" is indicated herein in alternative embodiments).

At step 308, main processor 202 may wait for a period of time. Waiting may be performed here, in other parts of mailbox communication process 300, and/or in other processes described below, in order to synchronize timing between the two processors. For example, in this case, waiting for 5 ms may give secondary processor 204 time to set ack GPIO 208 as an output.

At step 310, main processor 202 can send a command to secondary processor 204. For example, main processor 202 may use I²C bus 209 to place a command in the mailbox register 206 of secondary processor 204. Specific commands may vary based on what type of synchronization is being performed (e.g., boot, restart, shutdown, sleep, standby, etc.) and what specific stage of synchronization is taking place. For example, commands may include commands to perform boot or shutdown processing, commands to quiesce or activate device drivers and/or daemons, commands to turn hardware (e.g., DFR 112) on or off, etc. A command to quiesce a driver and/or daemon may direct the driver and/or daemon to refrain from performing any activity that may result in an attempt to communicate data to main processor 202 over USB link 210. This may ensure power savings and may also prevent a wakeup attempt by main processor 202 in response to the USB link 210 communication.

At step 312, secondary processor 204 can receive a command from main processor 202. For example, secondary processor 204 may receive the command in mailbox register 206. In some embodiments, the received command may include commands necessary for secondary processor 204 to perform the command (e.g., code that, when processed by secondary processor 204, causes secondary processor 204 to complete the command's tasks). In some embodiments, the received command may include higher level commands (e.g., a command to execute code already in a memory accessible to secondary processor 204 that, when processed by secondary processor 204, causes secondary processor 204 to complete the command's tasks).

At step 314, main processor 202 can notify secondary processor 204 that a new command has been sent to secondary processor 204. For example, main processor 202 may drive doorbell GPIO 208 to high to send an interrupt to secondary processor 204. This interrupt may serve as a signal to secondary processor 204 that data is available to be read in mailbox register 206. For example, secondary processor 204 may be configured so that when there is a high signal on doorbell GPIO 208 pin, an interrupt controller of secondary processor 204 may interrupt secondary processor 204 activity.

At step 316, secondary processor 204 can process the received command. For example, in response to the interrupt, secondary processor 204 may execute an interrupt service routine. The interrupt service routine may include reading the mailbox register 206 and loading commands therein into secondary processor 204 memory for processing. Secondary processor 204 may process the command from mailbox register 206. As noted above, the nature of the command may depend on the synchronization being performed and the specific step in the synchronization process. Secondary processor 204 may clear mailbox register 208. Clearing mailbox register 208 may safeguard against errors in case of a spurious interrupt. For example, if an interrupt is generated in secondary processor 204 due to a software bug or the like, the interrupt controller may interrupt secondary processor 204 activity and initiate execution of the interrupt service routine. If mailbox register 208 contains previously-processed commands at this time, secondary processor 204 may re-execute the commands. However, if mailbox register 208 has been cleared, secondary processor 204 will have no mailbox commands to process erroneously and may resume previous operations.

At step 320, secondary processor 204 can acknowledge the command received from main processor 202. For example, after processing the command, secondary processor 204 may drive ack GPIO 208 to output low to indicate that the command has been processed. Main processor 202 may detect the low output on ack GPIO 208, as described below.

At step 322, secondary processor 204 may wait for a period of time. As noted above, waiting may be performed in order to synchronize timing between the two processors. For example, in this case, waiting for 5 ms may give main processor 202 time to detect the change on ack GPIO 208.

At step 324, secondary processor 204 can configure the ack path of GPIO 208 for input. For example, after waiting, secondary processor 204 may reset secondary processor 204 ack GPIO 208 pin back to input. This step may restore ack GPIO 208 to a state of readiness for processing future mailbox communications according to process 300.

At step 326, main processor 202 can determine that secondary processor 204 has processed the command. For example, after sending the command, main processor 202 may poll on ack GPIO 208 to detect the low signal on ack GPIO 208. Main processor 202 may interpret a detected low signal on ack GPIO 208 to indicate that secondary processor 204 has processed the command. For example, as discussed below regarding boot, restart, shutdown, sleep, and/or standby processes, main processor 202 may continue these processes with acknowledgement that correct synchronization between main processor 202 and secondary processor 204 has occurred. In some cases, if a low signal is not detected on ack GPIO 208, main processor 202 may initiate a secondary processor 204 recovery process, as the lack of low signal on ack GPIO 208 may indicate to main processor 202 that the processors are not synchronized and there may be a problem with secondary processor 204.

At step 328, main processor 202 can reset the doorbell path of GPIO path 208. For example, when low is detected, main processor 202 may drive doorbell GPIO 208 back to output low. This step may restore doorbell GPIO 208 to a state of readiness for processing future mailbox communications according to process 300. For example, when main processor 202 places new data in mailbox register 206 and needs to inform secondary processor 204, main processor 202 may drive doorbell GPIO 208 high again and trigger another interrupt, as described above.

The following power management and coordination processes may employ the communication techniques of process 300. For example, cold boot process 400, shutdown process 500, enter standby process 600, leave standby process 700, warm reboot process 800, sleep process 900, and wake up process 1000 may include steps involving the use of GPIO paths 208 and/or I²C bus 209 for communication. In some cases, a detailed description of these steps is omitted to avoid redundancy. However, it will be understood that when a process includes sending data between main processor 202 and secondary processor 204 using GPIO paths 208 and/or I²C bus 209, the process steps may resemble steps of process 300.

Boot Process

Figure 4A:
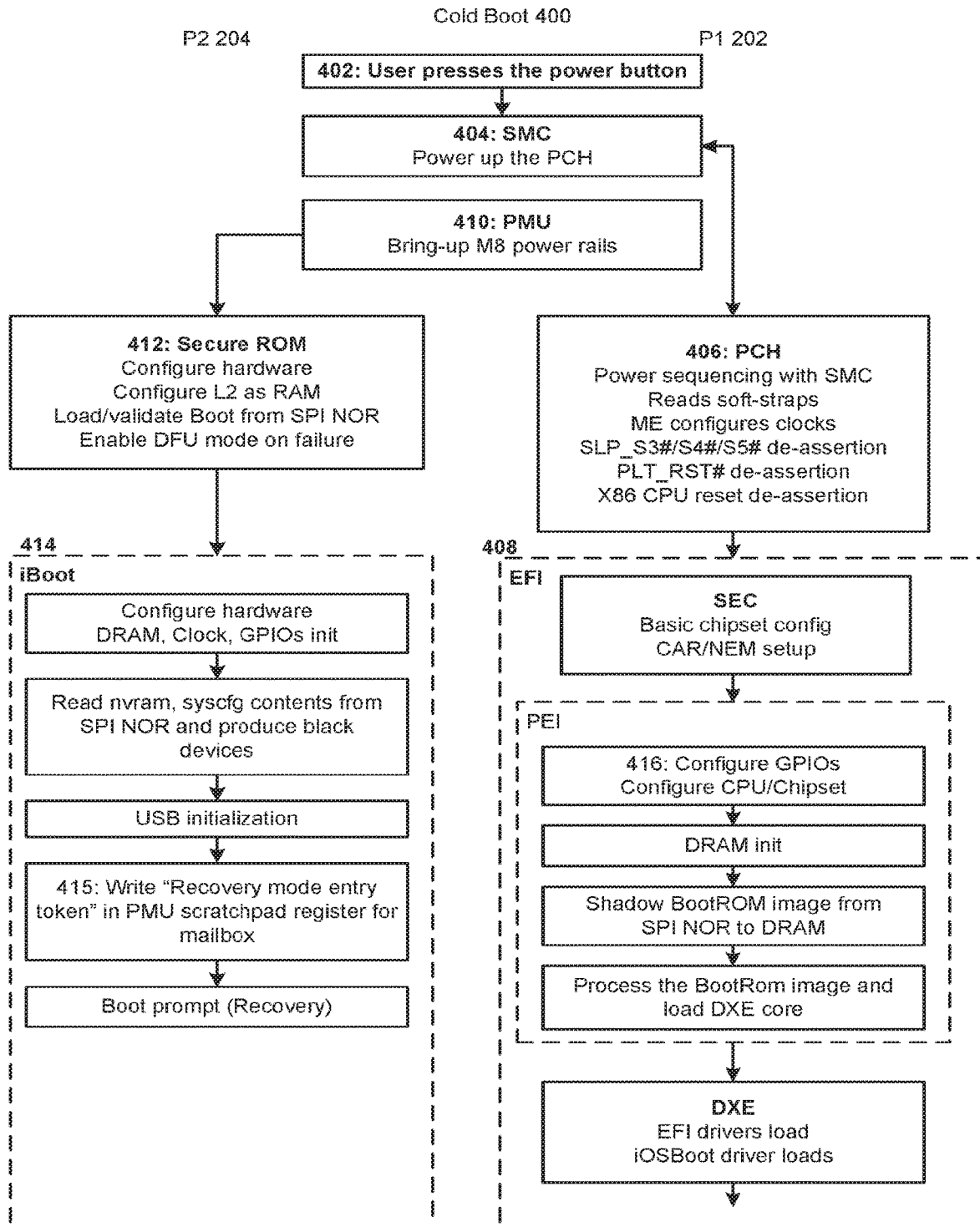
FIGS. 4A-4C show an example cold boot process.
Figure 4B:
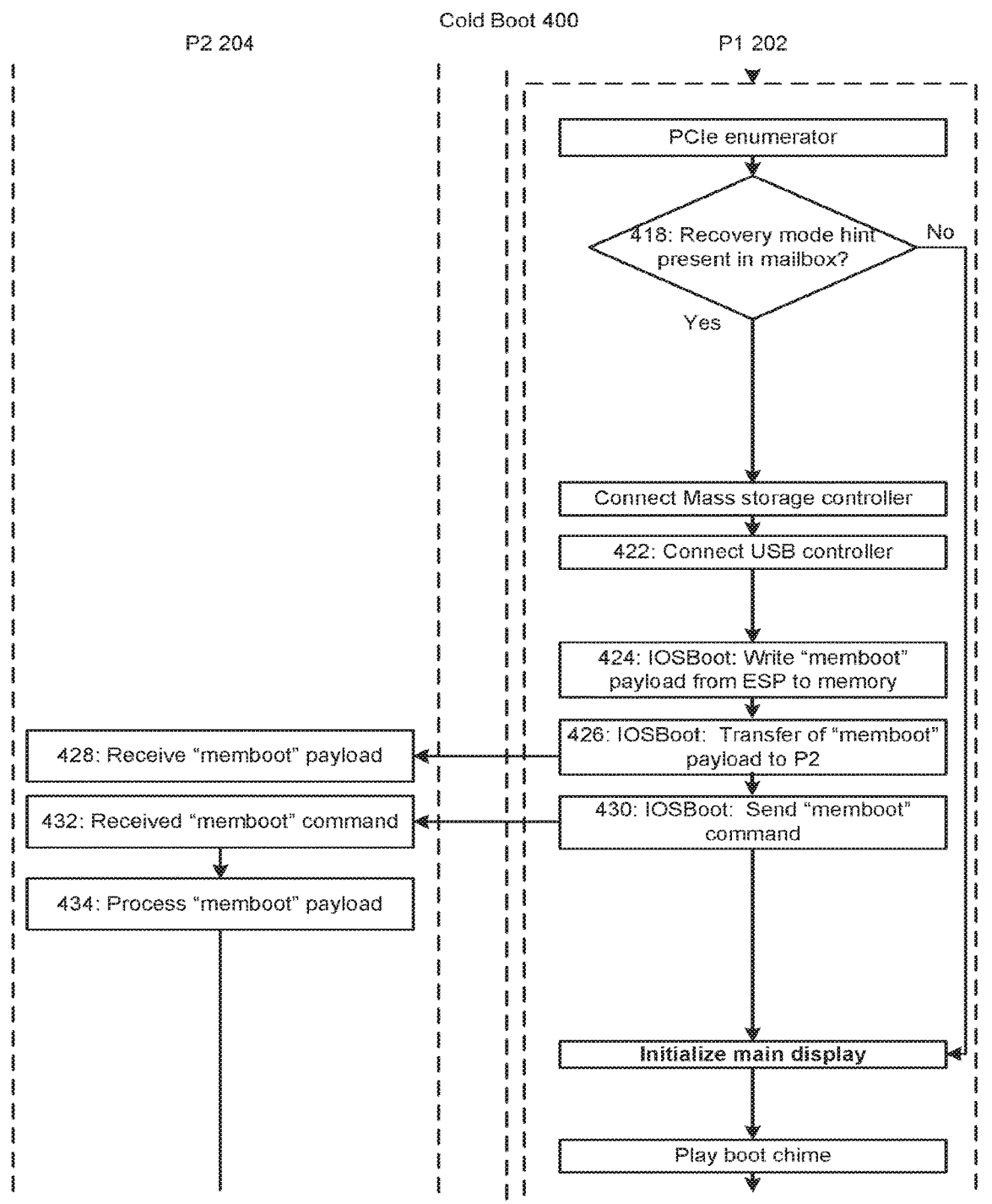
Figure 4C:
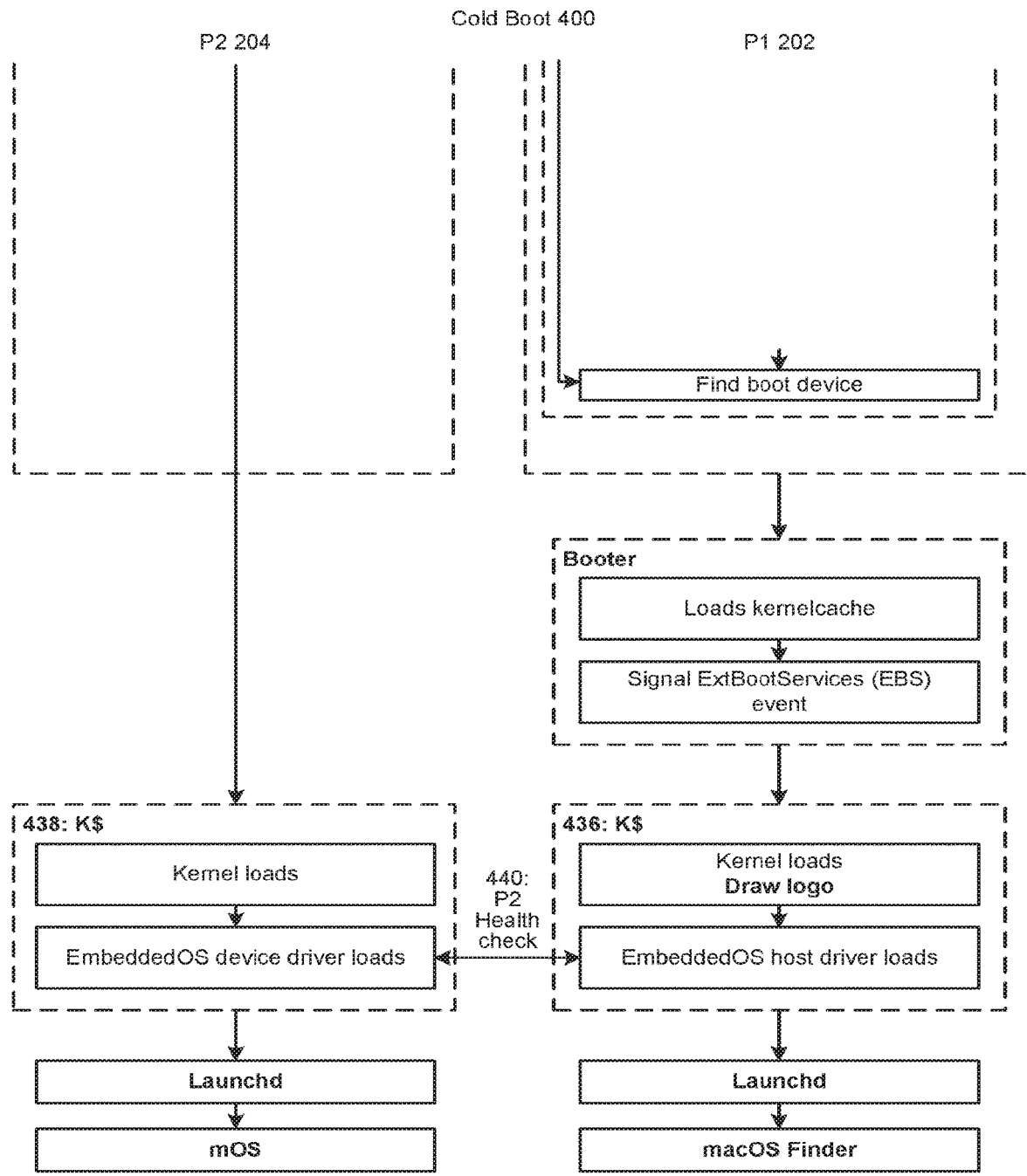

FIGS. 4A-4C show an example cold boot process 400. For example, cold boot process 400 may be initiated when a user presses a device 100 power button in 402. Detailed boot processing steps are shown in FIGS. 4A-4C, but for clarity, only certain steps relevant to boot coordination are discussed in detail herein. However, some steps not highlighted herein may also be relevant to boot coordination, for example by turning on devices or enabling processes used in boot coordination.

At step 404, main processor 202 may begin booting. For example, a user may power on device 100, for example by pressing a power button of device 100. SMC 220 may receive a signal when device 100 powers on. In response, SMC 220 may initiate main processor 202 boot up. For example, initial boot processing may include powering up platform controller hub (PCH) 214, which may manage boot up processing in subsequent steps.

At step 406, PCH 214 of main processor 202 may initialize other main processor 202 systems. For example, PCH 214 may perform power sequencing, clear registers, and de-assert initial boot assertions. Initial boot assertions may set device 100 components, such as main processor 202, as inactive. By de-asserting these assertions in a predefined sequence, PCH 214 may activate device 100 components so that boot processing may proceed. For example, when main processor 202 is de-asserted, main processor 202 may perform the following steps of process 400.

At step 408, main processor 202 may begin boot processing. For example, boot processing may include basic chipset, memory, and/or device driver initialization and setup. Additionally, boot processing may include the specific boot coordination steps described in detail below. Because main processor 202 has access to its boot commands, main processor 202 may continue boot processing whether communication is established with secondary processor 204 (e.g., as described below) or not.

At step 410, PMU 218 of secondary processor 204 may receive power and initiate secondary processor 204 boot up. This may include activating the power rails for secondary processor 204.

At step 412, secondary processor 204 may initialize itself using data stored in a small secure SPI NOR. For example the SPI NOR may be pre-loaded with limited boot commands, and/or limited boot commands may be placed in the SPI NOR when device 100 firmware is updated. Initialization may include configuring secondary processor 204 hardware and memory, loading and validating initial boot data for initial boot processing from the SPI NOR, loading basic drivers for link 210 and/or I²C bus 209, and/or enabling a recovery mode in case of secondary processor 204 failure.

At step 414, secondary processor 204 may begin boot processing. Boot processing may include configuring secondary processor 204 hardware, memory, and/or clock. Boot processing may also include initializing link 210 and GPIO 208. However, secondary processor 204 may only process commands from secure SPI NOR until receiving further commands from main processor 202.

At step 415, secondary processor 204 may configure mailbox register 206. For example, as part of initial boot processing, secondary processor 204 may initialize mailbox register 206 to receive commands from main processor 202, for example by writing a specific value therein. For example, the specific value may be a recovery mode entry token. When main processor 202 writes data into mailbox register 206 (e.g., as described in process 300 above), the recovery mode entry token may be overwritten with the data from main processor 202, and secondary processor 204 may process said data (e.g., as described in process 300 above). However, in the event that secondary processor 204 attempts to read and execute commands from mailbox register 206 before main processor 202 has overwritten the recovery mode entry token, processing the recovery mode entry token may place secondary processor 204 into recovery mode.

At step 416, main processor 202 may configure GPIO path 208. For example, as part of boot processing, main processor 202 may perform steps 302 and 306 of process 300.

At step 418, main processor 202 may check mailbox register 206 to determine whether secondary processor 204 has initialized mailbox register 206. For example, if the predefined value is present in mailbox register 206, main processor 202 may know secondary processor 204 has reached step 415. Main processor 202 may wait for initialization or may initiate recovery of secondary processor 204. For example, an OS driver of main processor 202 may detect an error condition and initialize a predefined secondary processor 204 recovery process.

At step 422, main processor 202 may configure link 210. For example, main processor 202 may activate device 100 USB controller as part of boot processing. This action may activate USB link 210 between main processor 202 and secondary processor 204. As described below, main processor 202 may use link 210 to send one or more boot images containing boot commands to secondary processor 204.

At step 424, main processor 202 may prepare commands that secondary processor 204 may use to complete boot processing. For example, main processor 202 may write a payload to memory. In some embodiments, payload may be a memboot payload including a firmware image. Secondary processor 204 may use the firmware image to boot itself. The firmware image may be one of a plurality of images secondary processor 204 may use to boot itself, in which case steps 424-434 may repeat until all images have been processed by secondary processor 204.

At step 426, main processor 202 may send the payload to secondary processor 204 according to process 300. For example, main processor 202 may use link 210 to send the firmware image to secondary processor 204.

At step 428, secondary processor 204 may receive the payload, for example over link 210. Main processor 202 boot processing may proceed while payload is being transferred.

At step 430, main processor 202 may direct secondary processor 204 to continue boot processing using the payload. For example, main processor 202 may send a command to secondary processor 204. This command may be sent using GPIO 208 and/or I²C bus 209, for example, and may instruct secondary processor 204 to process the payload being received through link 210. In other embodiments, the command may be sent over link 210.

At step 432, secondary processor 204 may receive the command. The command may be received over I²C bus 209, for example. In other embodiments, the command may be received over link 210.

At step 434, secondary processor 204 may process the payload to continue its boot process. For example, secondary processor 204 may execute commands in the firmware image and thereby perform boot processing.

At step 436, main processor 202 may finish boot processing. For example, main processor 202 may load its kernel and embedded OS host driver. Loading the kernel may place the operating system of main processor 202 in a booted state ready for use by a user. Loading the host driver may make device 100 hardware controlled by main processor 202 ready for use.

At step 438, secondary processor 204 may finish boot processing. For example, secondary processor 204 may load its kernel and embedded OS host driver. Loading the kernel may place the operating system of secondary processor 204 in a booted state ready for use by a user. Loading the host driver may make device 100 hardware controlled by secondary processor 204 (e.g., DFR 112) ready for use. For example, steps for loading the kernel and embedded OS host driver may have been contained in the image sent in step 426.

At step 440, main processor 202 may determine whether secondary processor 204 has booted. For example, main processor 202 may perform a health check on secondary processor 204 to ensure secondary processor 204 has finished booting to this point. If not, main processor 202 may initiate recovery of secondary processor 204, for example by restarting secondary processor 204 boot process. If the health check passes, both processors may launch to their respective OS starting points (macOS finder on main processor 202 and iOS prompt on secondary processor 204 in this example).

Shutdown Process

Figure 5A:
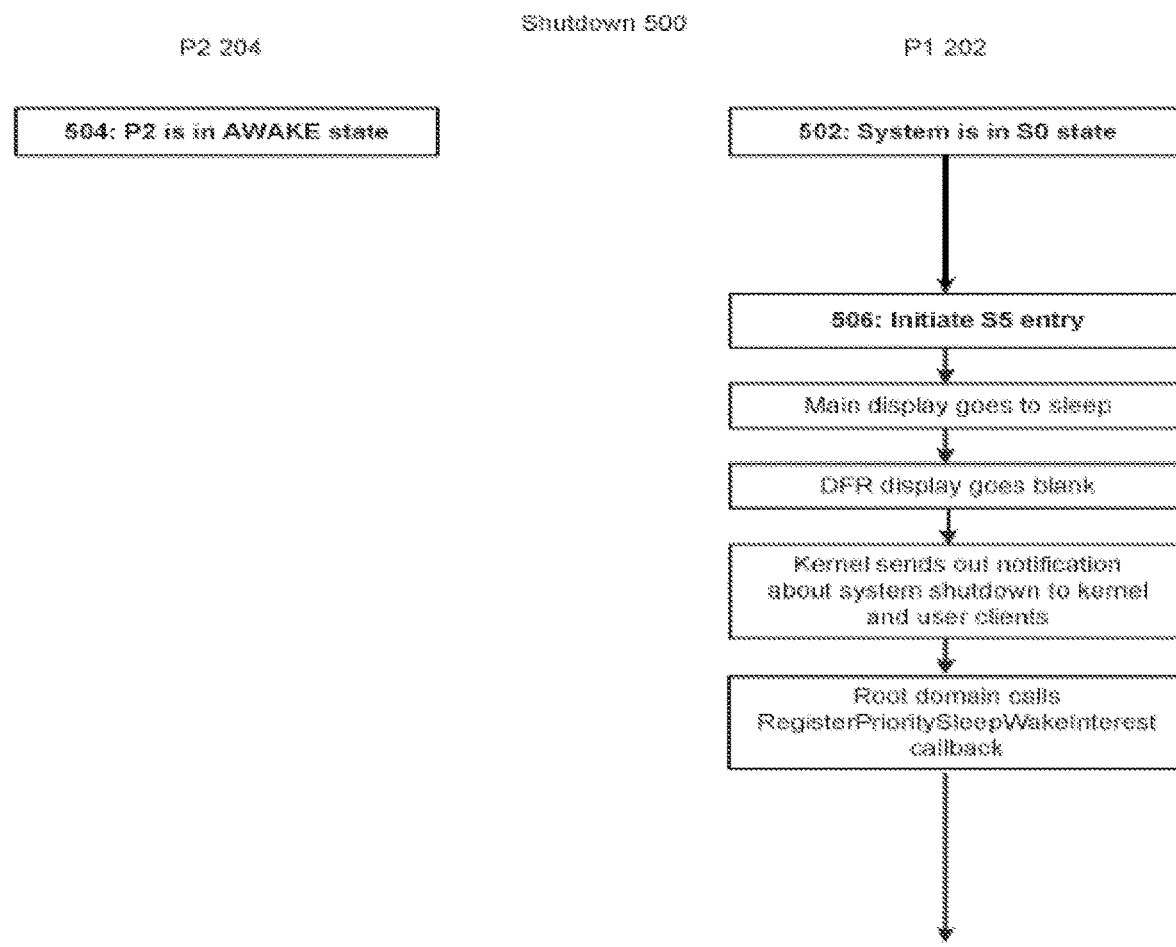
FIGS. 5A-5B show an example shutdown process.
Figure 5B:
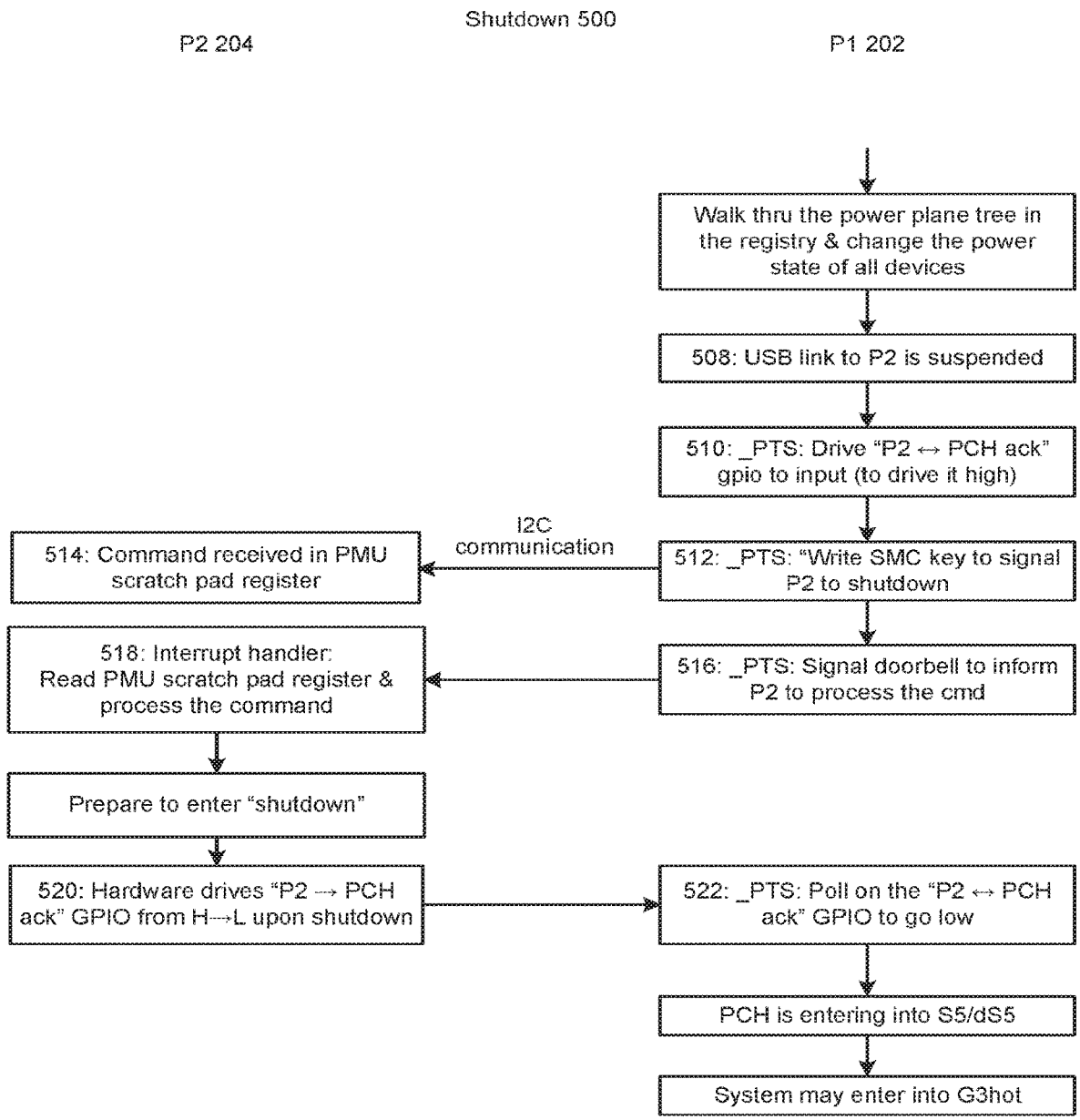

FIGS. 5A-5B show an example shutdown process 500. Detailed shutdown processing steps are shown in FIGS. 5A-5B, but for clarity, only certain steps relevant to shutdown coordination are discussed in detail herein. However, some steps not highlighted herein may also be relevant to shutdown coordination, for example by turning off devices or disabling processes such that they may be no longer usable for shutdown coordination. At the beginning of the shutdown process 500, main processor 202 may be in active state 502, and secondary processor 204 may be in active state 504.

At step 506, main processor may initiate shutdown and begin performing shutdown processes. For example, displays may be put to sleep; OS kernel may notify connected clients, applications, and other processes of impending shutdown; system 100 devices may be powered down, etc.

At step 508, main processor 202 may suspend link 210 as part of shutdown processing. For example, main processor 202 may power down system 100 USB resources, causing link 210 to become inactive. Accordingly, main processor 202 and secondary processor 204 may be restricted to communication using GPIO 208 and/or I²C bus 209 for the remainder of the shutdown process 500.

At step 510, main processor 202 may configure GPIO 208. For example, main processor 202 may drive main processor 202 ack GPIO 208 pin to high. This may authorize secondary processor 204 to send acknowledgements to main processor 202 using ack GPIO 208. Specifically, secondary processor 204 may acknowledge command processing by driving ack GPIO 208 low. Accordingly, by driving ack GPIO 208 high, main processor 202 can detect the change on ack GPIO 208 pin when secondary processor 204 drives ack GPIO 208 low.

At step 512, main processor 202 may prepare secondary processor 204 to begin shutdown processing. For example, main processor 202 may use I²C bus 209 to place a command in the mailbox register 206 of secondary processor 204. For example, the command may include an SMC key signaling secondary processor 204 to shut down.

At step 514, secondary processor 204 may receive the command in mailbox register 206.

At step 516, main processor 202 may trigger secondary processor 204 to begin shutdown processing. For example, main processor 202 may drive main processor 202 doorbell GPIO 208 pin to high to send an interrupt to secondary processor 204. This interrupt may serve as a signal to secondary processor 204 that data is available to be read in mailbox register 206.

At step 518, secondary processor 204 may perform shutdown processing. For example, in response to the interrupt, secondary processor 204 may read the mailbox register 206, loading commands therein into secondary processor 204 memory for processing. In this case, secondary processor 204 may process the SMC key shutdown command and enter a shutdown mode.

At step 520, secondary processor 204 may report completion of shutdown processing. For example, secondary processor 204 may drive secondary processor 204 ack GPIO 208 pin to low upon secondary processor 204 shutdown, telling main processor 202 that shutdown was successful.

At step 522, main processor 202 may check whether secondary processor 204 has completed shutdown processing. After sending the command, main processor 202 may poll on ack GPIO 208 to detect the low signal on ack. When low is detected, main processor 202 may shut down. If low is not detected, main processor 202 may initiate recovery of secondary processor 204, for example by restarting secondary processor 204 shutdown process.

Standby Processes

Figure 6A:
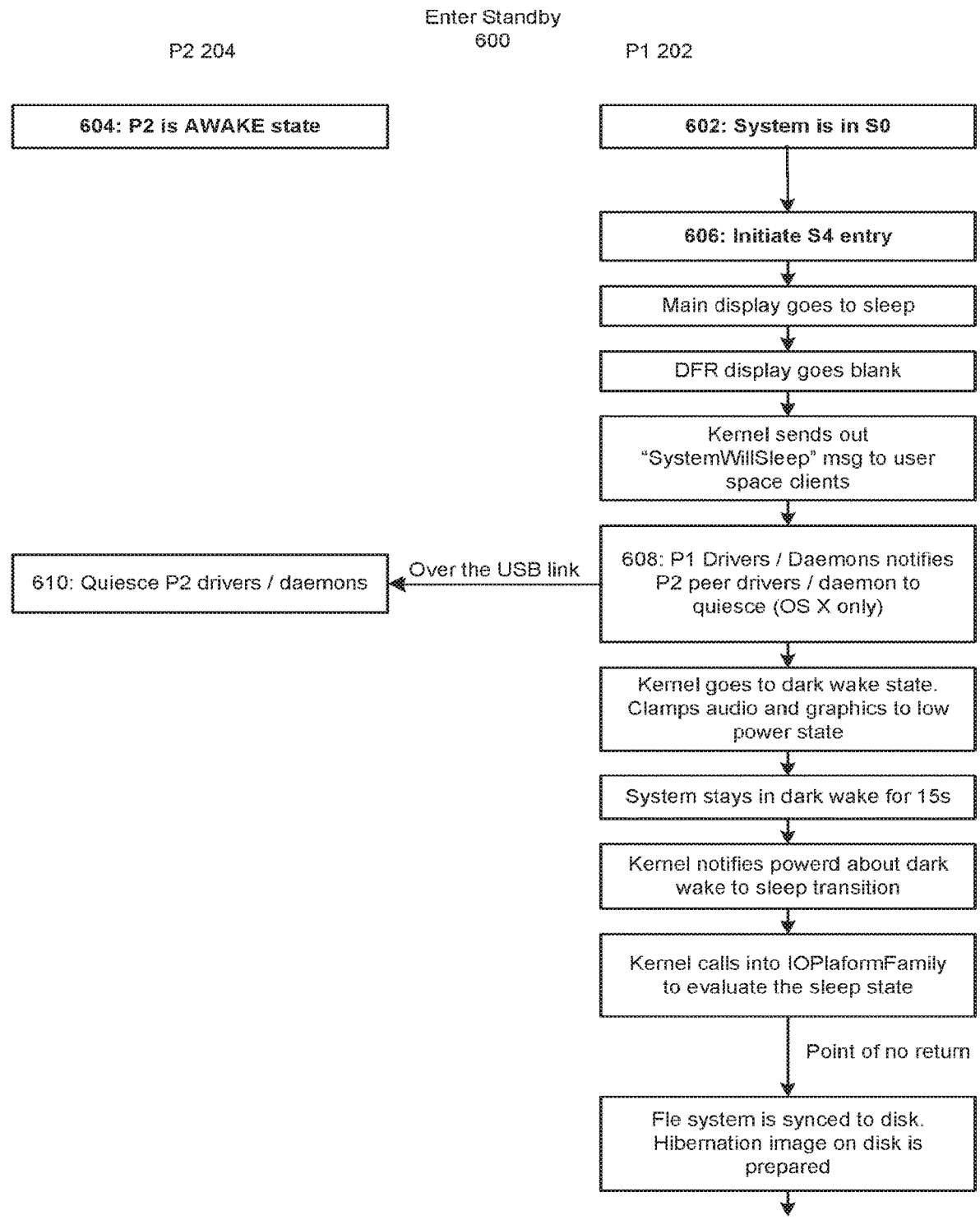
FIGS. 6A-6C show an example enter standby process.
Figure 6B:
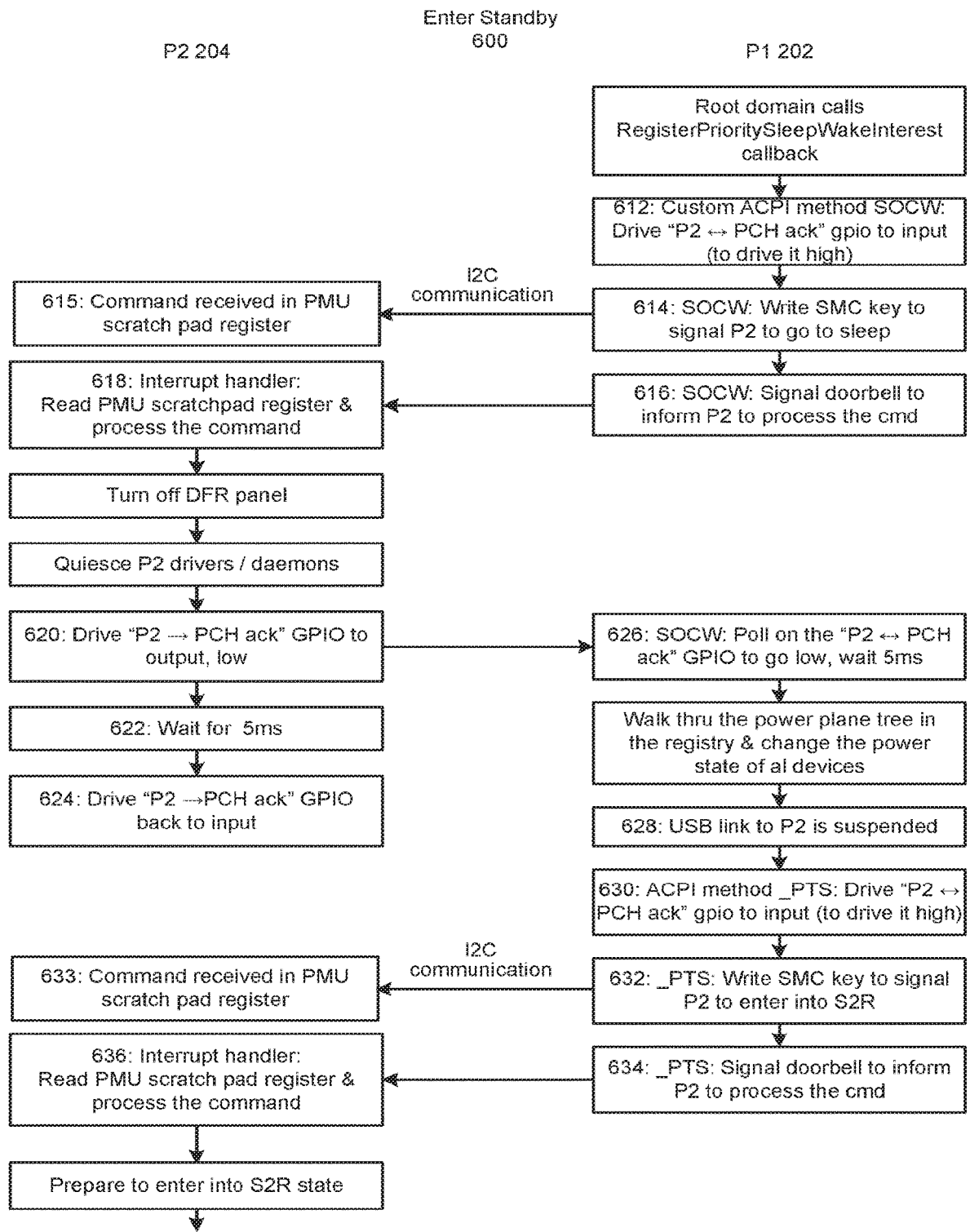
Figure 6C:
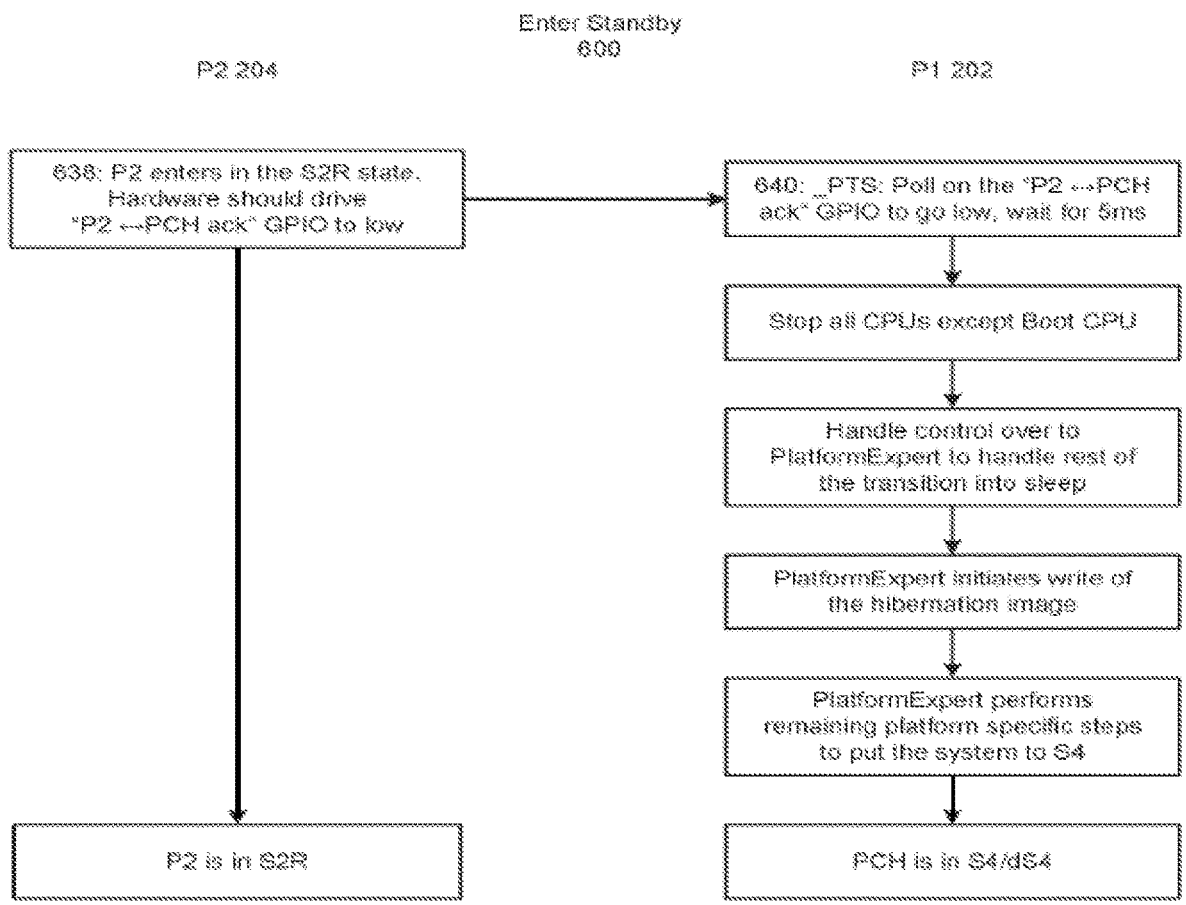

FIGS. 6A-6C show an example enter standby process 600. Detailed standby processing steps are shown in FIGS. 6A-6C, but for clarity, only certain steps relevant to standby coordination are discussed in detail herein. However, some steps not highlighted herein may also be relevant to standby coordination, for example by turning off devices or disabling processes such that they may be no longer usable for standby coordination.

In some implementations, main processor 202 may automatically enter standby after being in a sleep state for a defined length of time. Main processor 202 and secondary processor 204 can first wake up from sleep state (e.g., as described in process 1000 below), allowing main processor 202 to capture a system 100 state image and store it to system 100 memory. Accordingly, at the beginning of the standby process 600, main processor 202 may be in active state 602, and secondary processor 204 may be in active state 604.

At step 606, main processor 202 may initiate standby and begin performing standby processes. For example, main processor 202 may automatically enter standby after being in a sleep state for a defined length of time, after device 100 has been inactive for a defined length of time, or due to some other triggering condition. In some implementations, main processor 202 may enter standby in response to a user command to enter standby.

At step 608, main processor 202 may send commands directing secondary processor 204 to quiesce over link 210. In some embodiments, secondary processor 204 may have a different feature set from main processor 202, and while main processor 202 may perform specific kernel processing steps to enter standby, secondary processor 204 may take steps to reduce power consumption (e.g., quiesce active processes), for example.

At step 610, secondary processor 204 may receive the commands and quiesce its active drivers, daemons, and/or other processes. For example, drivers and processes for hardware (e.g., DFR 112) under the control of secondary processor 204 may be quiesced so that the hardware does not operate and use system 100 power or attempt communication with main processor 202 in standby mode. Meanwhile, main processor 202 may continue its own standby procedures, such as entering dark wake state, notifying processes and applications of upcoming standby state, preparing a hibernation image on a drive of system 100, etc. For example, main processor 202 may enter dark wake state, a state wherein main processor 202 is fully active but display 104 is off, to capture a hibernation image preserving the current state of all programs running on device 100. The hibernation image can be a representation of the state of device 100 that can be loaded to recreate the same state, for example after device 100 wake up. Main processor 202 may store the hibernation image so that the current state can be restored upon wake up from standby.

At step 612, main processor 202 may configure ack GPIO 208. For example, main processor 202 may drive main processor 202 ack GPIO 208 pin to high. Specifically, secondary processor 204 may acknowledge command processing by driving ack GPIO 208 low. Accordingly, by driving ack GPIO 208 high, main processor 202 can detect the change on ack GPIO 208 pin when secondary processor 204 drives ack GPIO 208 low.

At step 614, main processor 202 may use I²C bus 209 to place a command in the mailbox register 206 of secondary processor 204. For example, the command may include an SMC key signaling secondary processor 204 to go to sleep.

At step 615, secondary processor 204 may receive the command in mailbox register 206.

At step 616, main processor 202 may trigger secondary processor 204 to begin sleep processing. For example, main processor 202 may drive main processor 202 doorbell GPIO 208 pin high to send an interrupt to secondary processor 204. This interrupt may serve as a signal to secondary processor 204 that data is available to be read in mailbox register 206.

At step 618, secondary processor 204 may process the command in mailbox register 206. For example, in response to the interrupt, secondary processor 204 may read mailbox register 206 and load commands therein into secondary processor 204 memory for processing. In this case, secondary processor 204 may process the SMC key sleep command and enter a sleep mode, for example by turning off DFR 112 and/or other hardware and quiescing active drivers and/or daemons.

At step 620, secondary processor 204 may acknowledge completion of command processing. For example, secondary processor 204 may drive secondary processor 204 ack GPIO 208 pin to low upon secondary processor 204 sleep processing completion, telling main processor 202 that sleep entry was successful.

At step 622, secondary processor 204 may wait for a period of time. As noted above, waiting may be performed in order to synchronize timing between the two processors. For example, in this case, waiting for 5 ms may give main processor 202 time to detect the change on ack GPIO 208.

At step 624, secondary processor 204 may restore ack GPIO 208 to a state of readiness for processing future mailbox communications according to process 300. For example, after waiting, secondary processor 204 may drive ack GPIO 208 back to input.

At step 626, main processor 202 may determine whether secondary processor 204 has processed the data in mailbox register 206. For example, after sending the command, main processor 202 may poll on ack GPIO 208 to detect the low signal on ack. When low is detected, in main processor 202 may continue standby processing. If low is not detected, main processor 202 may initiate recovery of secondary processor 204, for example by restarting secondary processor 204 standby process.

As part of continued standby processing, at step 628, main processor 202 may suspend link 210. For example, main processor 202 may power down system 100 USB resources, causing link 210 to become inactive. Accordingly, main processor 202 and secondary processor 204 may be restricted to communication using GPIO 208 for the remainder of the standby process 600.

At step 630, main processor 202 may reset ack GPIO 208 pin. For example, main processor 202 may drive main processor 202 ack GPIO 208 high. Accordingly, secondary processor 204 may send future acknowledgements to main processor 202 by driving ack GPIO 208 low.

At step 632, main processor 202 may use I²C bus 209 to place a command in the mailbox register 206 of secondary processor 204. For example, the command may include an SMC key signaling secondary processor 204 to enter a standby mode.

At step 633, secondary processor 204 may receive the command in mailbox register 206.

At step 634, main processor 202 may trigger secondary processor 204 to begin standby processing. For example, main processor 202 may drive main processor 202 doorbell GPIO 208 pin high to send an interrupt to secondary processor 204. This interrupt may serve as a signal to secondary processor 204 that data is available to be read in mailbox register 206.

At step 636, secondary processor 204 may process the command in mailbox register 206. For example, in response to the interrupt, secondary processor 204 may read the mailbox register 206, loading commands therein into secondary processor 204 memory for processing. In this case, secondary processor 204 may process the SMC key standby command and enter a standby mode, in which secondary processor 204 may perform no independent processing but may wait for a future signal from main processor 202 to exit standby mode.

At step 638, secondary processor 204 may acknowledge entry into standby mode. For example, secondary processor 204 may drive ack GPIO 208 low upon secondary processor 204 standby processing completion, telling main processor 202 that standby entry was successful.

At step 626, main processor 202 may determine whether secondary processor 204 has processed the data in mailbox register 206. For example, after sending the command, at step 640, main processor 202 may poll on ack GPIO 208 to detect the low signal on ack. When low is detected, main processor 202 may continue standby processing and enter standby mode. If low is not detected, main processor 202 may initiate recovery of secondary processor 204, for example by restarting secondary processor 204 standby process.

Figure 7A:
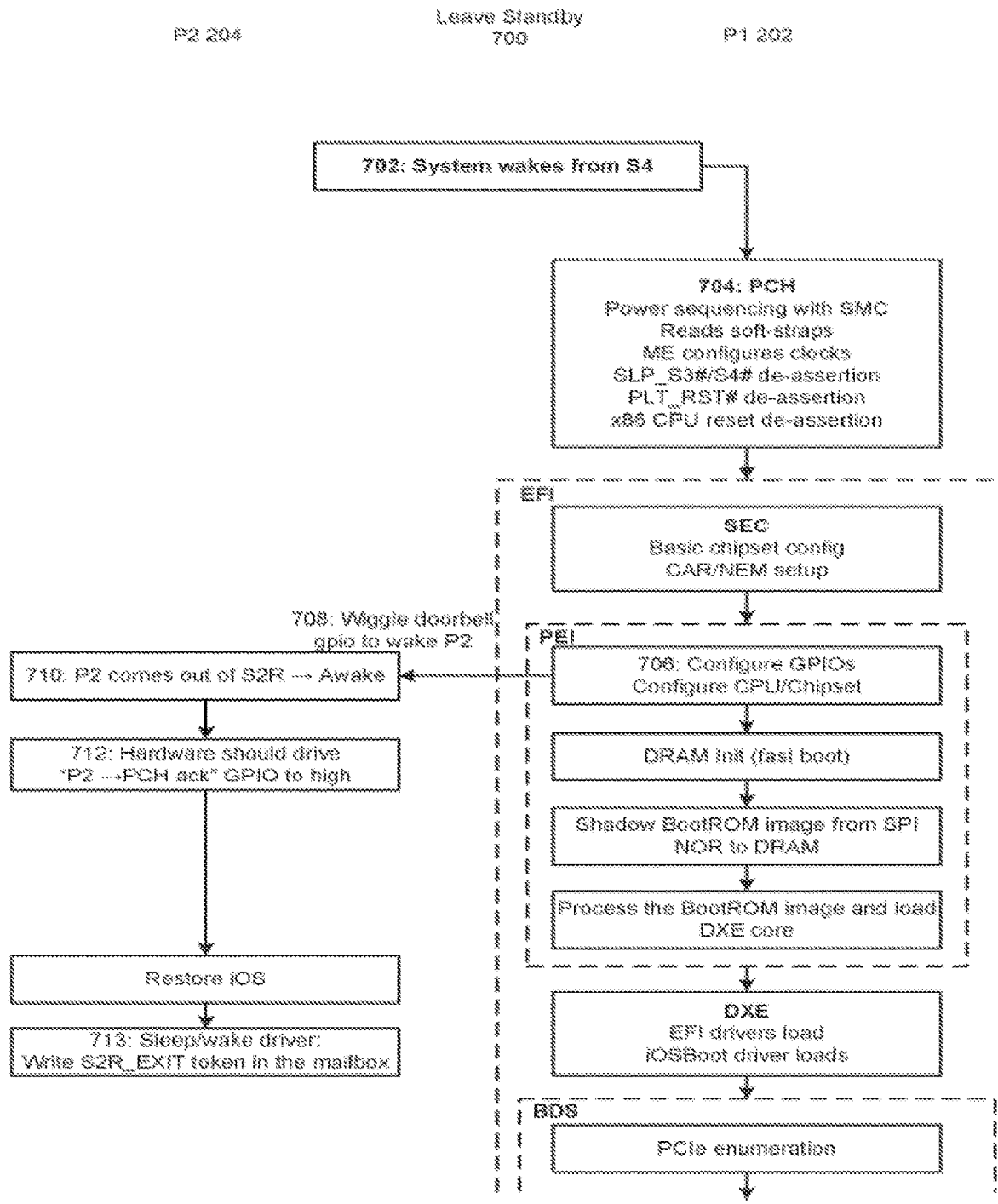
FIGS. 7A-7C show an example leave standby process.
Figure 7B:
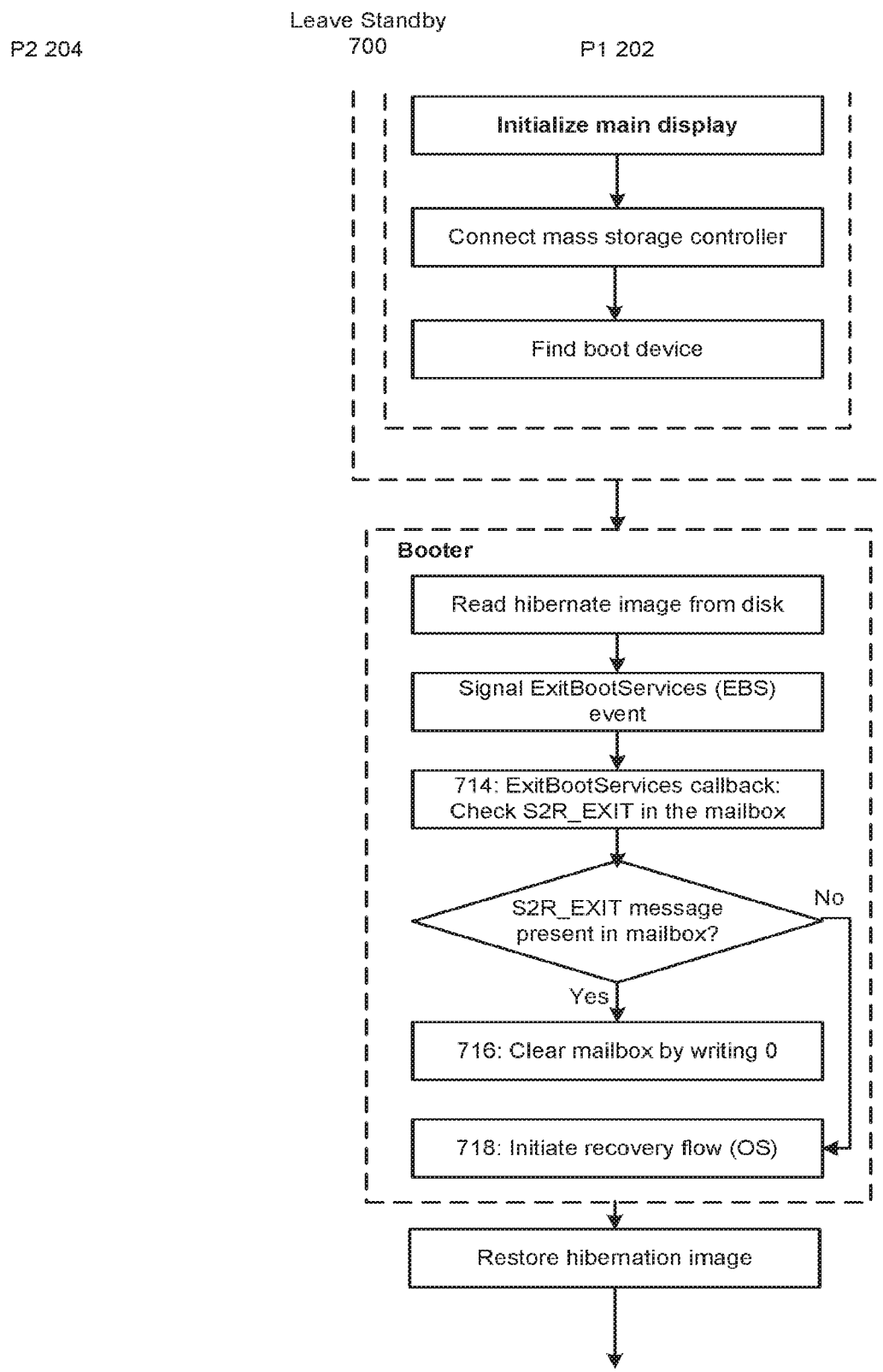
Figure 7C:
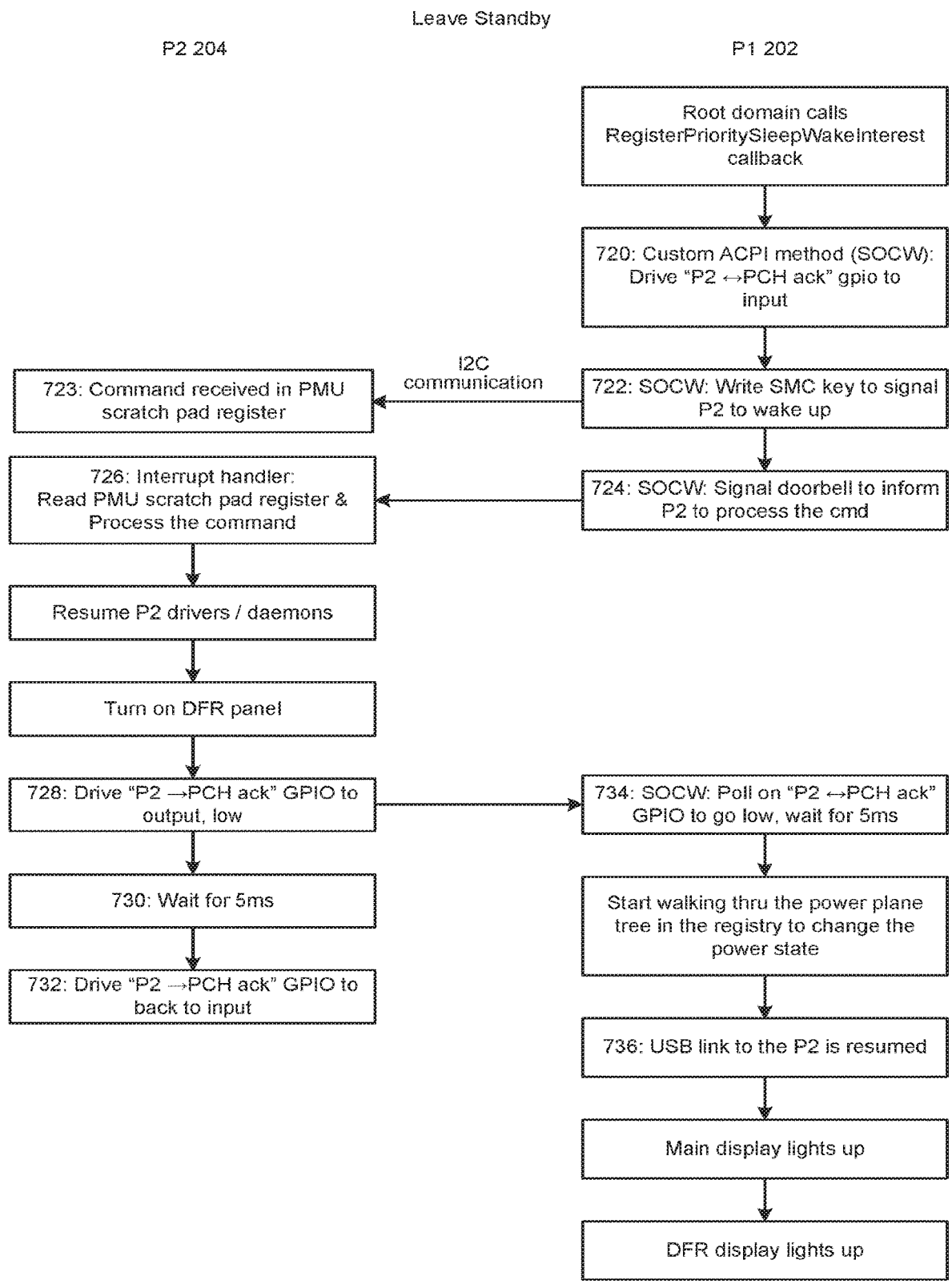

FIGS. 7A-7C show an example leave standby process 700. Detailed leave standby processing steps are shown in FIGS. 7A-7C, but for clarity, only certain steps relevant to leave standby coordination are discussed in detail herein. However, some steps not highlighted herein may also be relevant to leave standby coordination, for example by turning on devices or enabling processes used in leave standby coordination.

At step 702, device 100 may wake up from standby, for example in response to user input made through an input device, such as a movement or click of a mouse or trackpad or an input to a keyboard.

At step 704, main processor 202 may begin leave standby processing. For example, PCH 214 may perform power sequencing, clear registers, and de-assert initial boot assertions. Initial boot assertions may set device 100 components, such as main processor 202, as inactive. By de-asserting these assertions in a predefined sequence, PCH 214 may activate device 100 components so that leave standby processing may proceed. For example, when main processor 202 is de-asserted, main processor 202 may perform the following steps of process 700.

As part of leave standby processing, at step 706, main processor 202 may configure GPIO 208 to enable communication with secondary processor 204. For example, main processor 202 may perform steps 302 and 306 of process 300.

At step 708, main processor 202 may use GPIO 208 to wiggle doorbell to wake secondary processor 204, using mailbox processing 300 described above. For example, main processor 202 may drive doorbell GPIO 208 high, triggering an interrupt in secondary processor 204. The interrupt may cause secondary processor 204 to exit standby mode.

In response, at step 710, secondary processor 204 may wake up from standby mode. Standby mode may be a low power mode of secondary processor 204. By waking up, secondary processor 204 may be in a state wherein it can perform general processing functions such as operating hardware under its control (e.g., DFR 112).

At step 712, secondary processor 204 may restore ack GPIO 208 to a state of readiness for processing future mailbox communications according to process 300. For example, secondary processor 204 may drive secondary processor 204 ack GPIO 208 pin to high.

Secondary processor 204 may continue leave standby processing, for example by restoring secondary processor 204 operating system. Meanwhile, main processor 202 may also continue leave standby processing, for example by initiating system 100 memory, loading the most recent hibernation image from disk, processing the hibernation image, restoring drivers and controllers, initializing displays and boot devices, etc.

At step 713, secondary processor 204 may initialize mailbox register 206 to receive commands from main processor 202. For example secondary processor 204 may write a specific value into mailbox register 206, such as a standby exit token. When main processor 202 writes data into mailbox register 206 (e.g., as described in process 300 above), the standby exit token may be overwritten with the data from main processor 202, and secondary processor 204 may process said data (e.g., as described in process 300 above). However, in the event that secondary processor 204 attempts to read and execute commands from mailbox register 206 before main processor 202 has overwritten the standby exit token, processing the standby exit token may place secondary processor 204 into recovery mode.

As part of leave standby processing, at step 714, main processor 202 may check whether secondary processor 204 has left standby. For example, if the predefined value is present in mailbox register 206, main processor 202 may know secondary processor 204 has reached step 713. Main processor 202 may wait for initialization or may initiate recovery of secondary processor 204. For example, an OS driver of main processor 202 may detect an error condition and initialize a predefined secondary processor 204 recovery process.

If there is a message in mailbox indicating that secondary processor 204 has left standby, at step 716, main processor 202 may clear mailbox register 206. For example, main processor 202 may use I²C bus 209 to write a logic zero to mailbox register 206.

If there is not a message in mailbox indicating that secondary processor 204 has left standby, at step 718, main processor 202 may initiate recovery of secondary processor 204. For example, main processor 202 may initialize a predefined secondary processor 204 recovery process, as described above.

At step 720, main processor 202 may prepare secondary processor 204 to send acknowledgements to main processor 202 using ack GPIO 208. For example, main processor 202 may drive ack GPIO 208 high so that main processor 202 can detect the change on ack GPIO 208 pin when secondary processor 204 drives ack GPIO 208 low.

At step 722, main processor 202 may use I²C bus 209 to place a command in mailbox register 206 of secondary processor 204. For example, the command may include an SMC key signaling secondary processor 204 to wake up.

At step 723, secondary processor 204 may receive the command in mailbox register 206.

At step 724, main processor 202 may trigger secondary processor 204 to begin wakeup processing. For example, main processor 202 may drive main processor 202 doorbell GPIO 208 pin high to send an interrupt to secondary processor 204. This interrupt may serve as a signal to secondary processor 204 that data is available to be read in mailbox register 206.

At step 726, secondary processor 204 may process the command in mailbox register 206. For example, in response to the interrupt, secondary processor 204 may read the mailbox register 206, loading commands therein into secondary processor 204 memory for processing. In this case, secondary processor 204 may process the SMC key wakeup command and restore drivers/daemons and turn on hardware (e.g., DFR 112).

After processing the command, at step 728, secondary processor 204 may acknowledge awakening. For example, secondary processor 204 may drive ack GPIO 208 low upon secondary processor 204 standby processing completion, telling main processor 202 that wakeup processing was successful.

At step 730, secondary processor 204 may wait for a period of time. As noted above, waiting may be performed in order to synchronize timing between the two processors. For example, in this case, waiting for 5 ms may give main processor 202 time to detect the change on ack GPIO 208.

At step 734, secondary processor 204 may restore ack GPIO 208 to a state of readiness for processing future mailbox communications according to process 300. For example, after waiting, secondary processor 204 may reset secondary processor 204 ack GPIO 208 pin back to input.

At step 734, main processor 202 may determine whether secondary processor 204 has processed the data in mailbox register 206. For example, after sending the command, main processor 202 may poll on ack GPIO 208 to detect the low signal on ack. When low is detected, main processor 202 may continue leave standby processing. If low is not detected, main processor 202 may initiate recovery of secondary processor 204, for example by restarting secondary processor 204 leave standby process.

As part of continued standby processing, at step 736, main processor 202 may resume link 210. For example, main processor 202 may restore system 100 USB power, reactivating link 210. Accordingly, main processor 202 and secondary processor 204 may be able to communicate using link 210 in normal mode. Thereafter, main processor 202 may complete leave standby processing.

Reboot Process

Figure 8A:
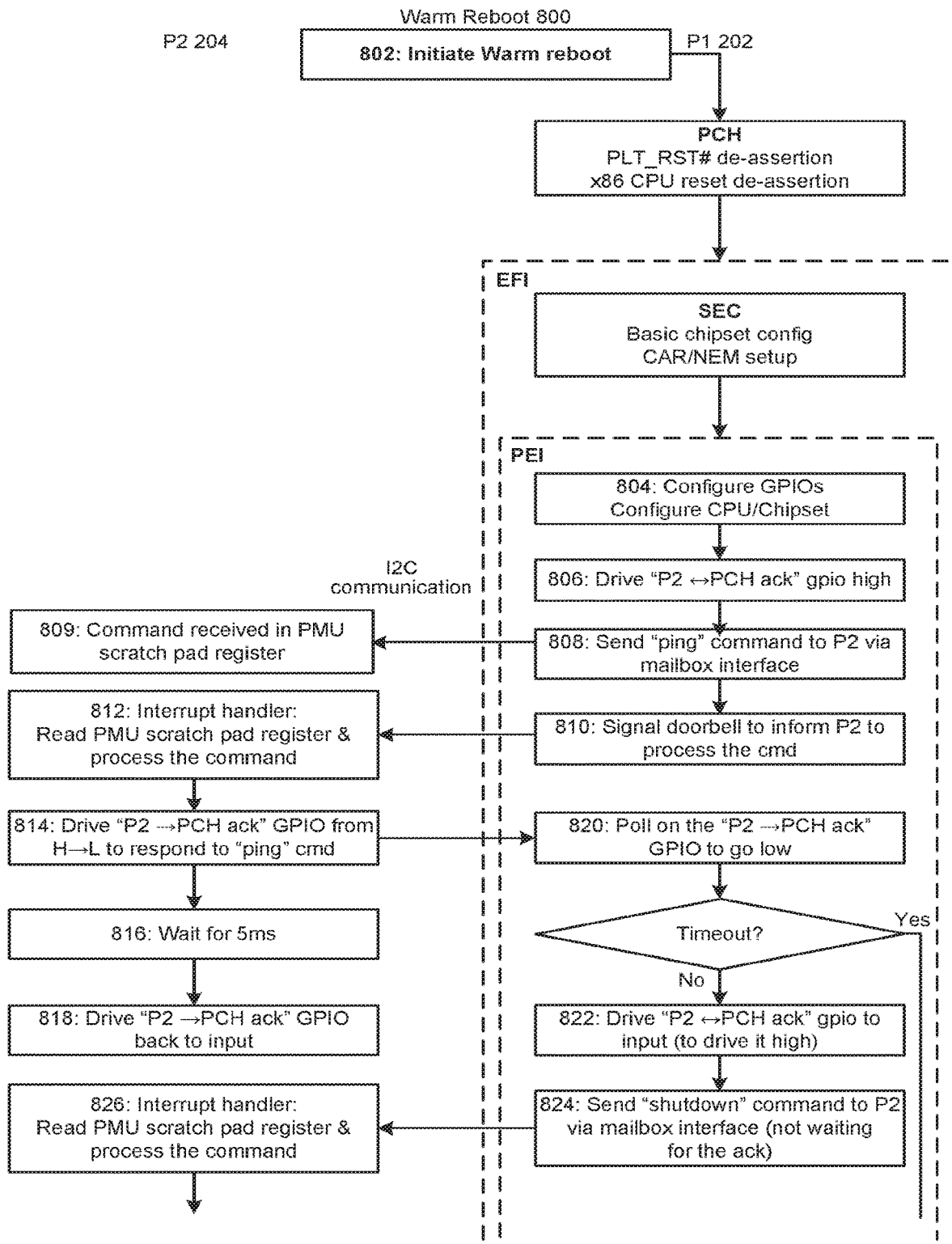
FIGS. 8A-8B show an example warm reboot process.
Figure 8B:
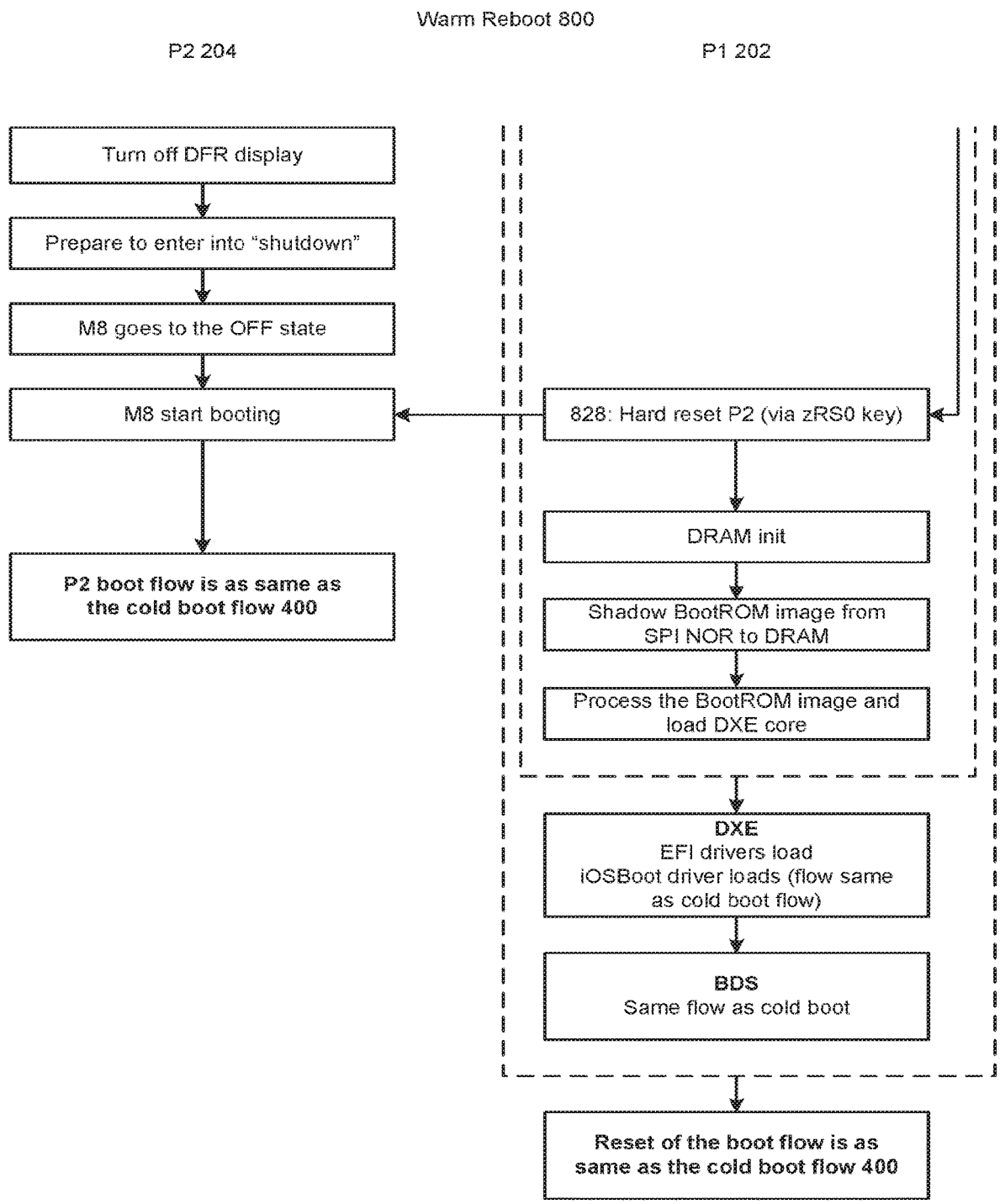

FIGS. 8A-8B show an example warm reboot process 800. Detailed reboot processing steps are shown in FIGS. 8A-8B, but for clarity, only certain steps relevant to reboot coordination are discussed in detail herein. However, some steps not highlighted herein may also be relevant to reboot coordination, for example by turning on devices or enabling processes used in reboot coordination.

At step 802, device 100 may initiate a reboot. For example, in response to user input made through an input device (e.g., a command through main processor 202 OS to reboot or pressing and/or holding a button on device 100 to force reboot), main processor 202 may begin reboot processing. In some implementations, PCH 214 may perform power sequencing, clear registers, and de-assert initial boot assertions. Initial boot assertions may set device 100 components, such as main processor 202, as inactive. By de-asserting these assertions in a predefined sequence, PCH 214 may activate device 100 components so that boot processing may proceed. For example, when main processor 202 is de-asserted, main processor 202 may perform the following steps of process 400.

As part of reboot processing, at step 804, main processor 202 may initialize GPIO paths 208. For example, as part of reboot processing, main processor 202 may perform step 302 of process 300.

At step 806, main processor 202 may configure ack GPIO 208. For example, main processor 202 may drive main processor 202 ack GPIO 208 pin to high. Specifically, secondary processor 204 may acknowledge command processing by driving ack GPIO 208 low. Accordingly, by driving ack GPIO 208 high, main processor 202 can detect the change on ack GPIO 208 pin when secondary processor 204 drives ack GPIO 208 low.

At step 808, main processor 202 may use I²C bus 209 to place a command in the mailbox register 206 of secondary processor 204. For example, the command may include a ping command requesting a response from secondary processor 204.

At step 809, secondary processor 204 may receive the command in mailbox register 206.

At step 810, main processor 202 may trigger secondary processor 204 to acknowledge the ping. For example, main processor 202 may drive main processor 202 doorbell GPIO 208 pin high to send an interrupt to secondary processor 204. This interrupt may serve as a signal to secondary processor 204 that data is available to be read in mailbox register 206.

At step 812, secondary processor 204 may process the command in mailbox register 206. For example, in response to the interrupt, secondary processor 204 may read the mailbox register 206, loading commands therein into secondary processor 204 memory for processing. In this case, secondary processor 204 may process the ping command and prepare a response.

At step 814, secondary processor 204 may acknowledge the ping. For example, secondary processor 204 may drive ack GPIO 208 low upon secondary processor 204 standby processing completion, telling main processor 202 that secondary processor 204 received the ping.

At step 816, secondary processor 204 may wait for a period of time. As noted above, waiting may be performed in order to synchronize timing between the two processors. For example, in this case, waiting for 5 ms may give main processor 202 time to detect the change on ack GPIO 208.

At step 818, secondary processor 204 may restore ack GPIO 208 to a state of readiness for processing future mailbox communications according to process 300. For example, after waiting, secondary processor 204 may reset secondary processor 204 ack GPIO 208 pin back to input.

At step 820, main processor 202 may determine whether secondary processor 204 has processed the data in mailbox register 206. For example, after sending the command, main processor 202 may poll on ack GPIO 208 to detect the low signal on ack. In case of timeout for the ping message, main processor 202 may perform a hard reset of secondary processor 204. Main processor 202 may only send the shutdown message if secondary processor 204 responded to the previous ping message successfully.

If ping is received, steps 822-826 may be performed. At step 822, main processor 202 may drive main processor 202 doorbell GPIO 208 pin high to send an interrupt to secondary processor 204. This interrupt may serve as a signal to secondary processor 204 that data is available to be read in mailbox register 206.

At step 824, main processor 202 may use I²C bus 209 to place a command in the mailbox register 206 of secondary processor 204. For example, the command may include a shutdown command instructing secondary processor 204 to shut down.

At step 826, secondary processor 204 may process the shutdown command and initiate its own shutdown process. For example, secondary processor 204 may turn off hardware under its control (e.g., DFR 112), enter an off state, and start rebooting. Once secondary processor 204 is completely shut down, PMU 218 may kick secondary processor 204 up again. Secondary processor 204 may then go through SecureROM→iBoot path as in cold boot 400.

If main processor 202 receives no ack, at step 828, main processor 202 may send a hard reset command to secondary processor 204, forcing secondary processor 204 reboot processing. Main processor 202 may also continue its own reboot processing as shown, for example initializing system 100 memory, storing and processing a reboot image, loading drivers, and continuing with the boot path from cold boot 400.

Sleep Processes

Figure 9A:
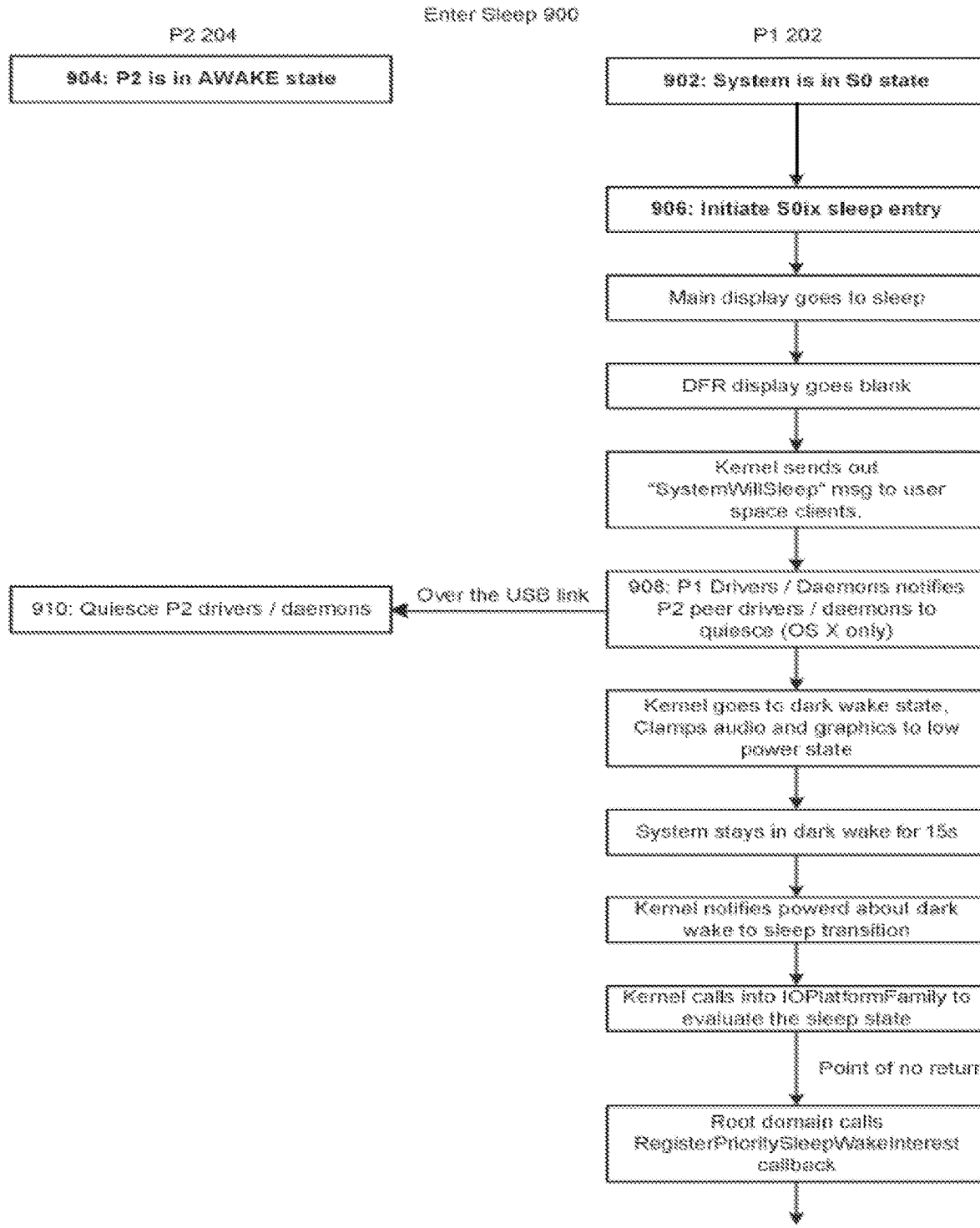
FIGS. 9A-9B show an example sleep process.
Figure 9B:
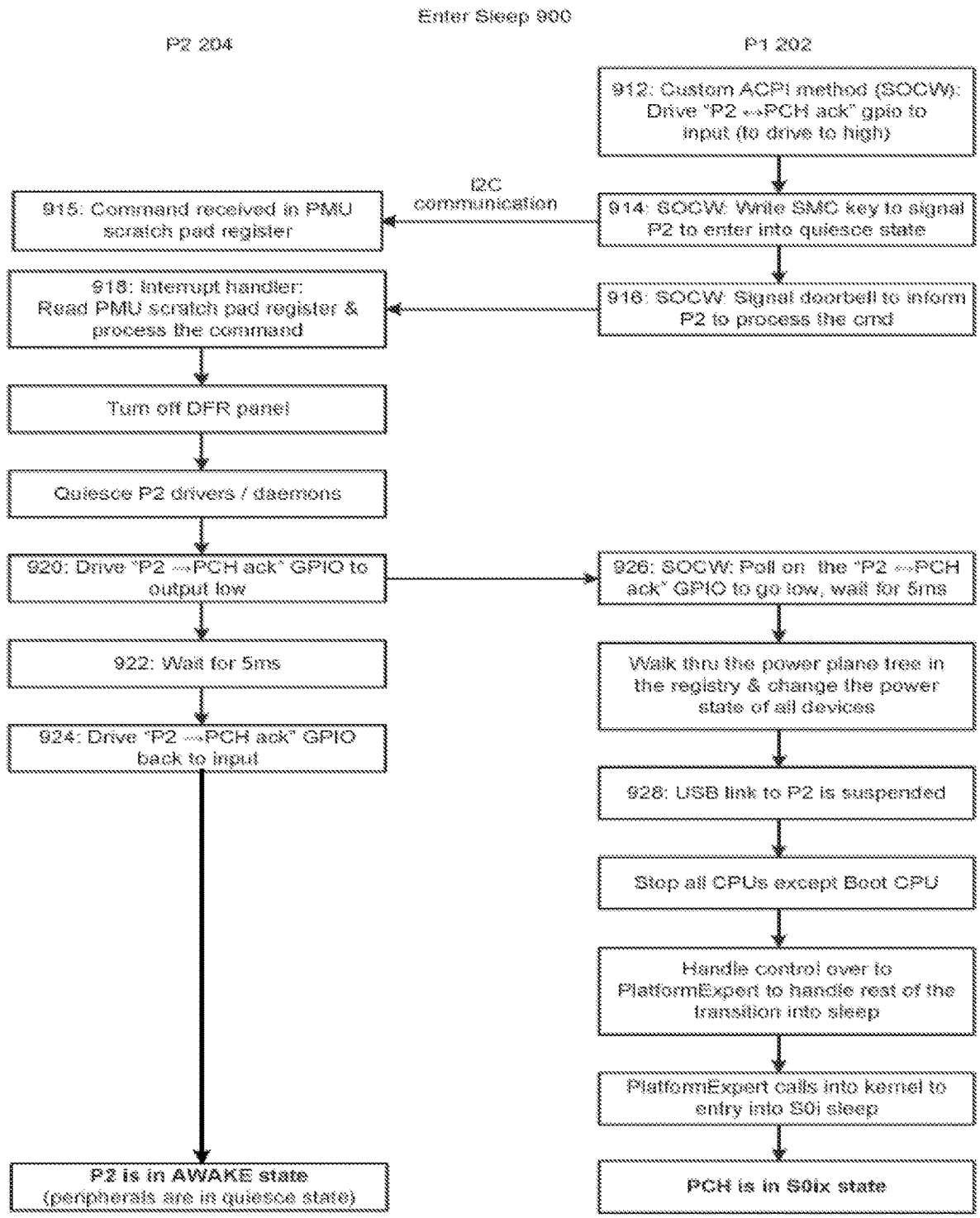

FIGS. 9A-9B show an example sleep process 900. Detailed sleep processing steps are shown in FIGS. 9A-9B, but for clarity, only certain steps relevant to sleep coordination are discussed in detail herein. However, some steps not highlighted herein may also be relevant to sleep coordination, for example by turning off devices or disabling processes such that they may be no longer usable for sleep coordination.

At the beginning of the sleep process 900, main processor 202 may be in active state 902, and secondary processor 204 may be in active state 904.

At step 906, main processor may initiate sleep and begin performing sleep processes. For example, main processor 202 may place display 104 in sleep mode and may notify system 100 applications and/or processes of the impending sleep transition.

At step 908, main processor 202 may send commands directing secondary processor 204 to quiesce over link 210. In some embodiments, secondary processor 204 may have a different feature set from main processor 202, and while main processor 202 may perform specific kernel processing steps to enter sleep, secondary processor 204 may take steps to reduce power consumption (e.g., quiesce active processes), for example.

At step 910, secondary processor 204 may receive the commands and quiesce its active drivers, daemons, and/or other processes. For example, drivers and processes for hardware (e.g., DFR 112) under the control of secondary processor 204 may be quiesced so that the hardware does not operate and use system 100 power in sleep mode. Meanwhile, main processor 202 may continue its own sleep procedures, such as entering dark wake state, placing audio and graphics systems into low power state, notifying processes and applications of upcoming sleep state, etc.

At step 912, main processor 202 may configure ack GPIO 208. For example, main processor 202 may drive main processor 202 ack GPIO 208 pin to high. Specifically, secondary processor 204 may acknowledge command processing by driving ack GPIO 208 low. Accordingly, by driving ack GPIO 208 high, main processor 202 can detect the change on ack GPIO 208 pin when secondary processor 204 drives ack GPIO 208 low.

At step 914, main processor 202 may use $I^2C$ bus 209 to place a command in the mailbox register 206 of secondary processor 204. For example, the command may include an SMC key signaling secondary processor 204 to enter a quiesce state.

At step 915, secondary processor 204 may receive the command in mailbox register 206.

At step 916, main processor 202 may trigger secondary processor 204 to process the command. For example, main processor 202 may drive main processor 202 doorbell GPIO 208 pin high to send an interrupt to secondary processor 204. This interrupt may serve as a signal to secondary processor 204 that data is available to be read in mailbox register 206.

At step 918, secondary processor 204 may process the command in mailbox register 206. For example, in response to the interrupt, secondary processor 204 may read the mailbox register 206, loading commands therein into secondary processor 204 memory for processing. In this case, secondary processor 204 may process the SMC key quiesce command and, for example, turn off DFR 112 and/or other hardware and quiesce active drivers and/or daemons.

After processing the command, at step 920, secondary processor 204 may acknowledge entry into quiesce state. For example, secondary processor 204 may drive ack GPIO 208 low upon secondary processor 204 standby processing completion, telling main processor 202 that quiesce processing was successful.

At step 922, secondary processor 204 may wait for a period of time. As noted above, waiting may be performed in order to synchronize timing between the two processors. For example, in this case, waiting for 5 ms may give main processor 202 time to detect the change on ack GPIO 208.

At step 924, secondary processor 204 may restore ack GPIO 208 to a state of readiness for processing future mailbox communications according to process 300. For example, after waiting, secondary processor 204 may reset secondary processor 204 ack GPIO 208 pin back to input. At this point, secondary processor 204 may be in a state equivalent to sleep, wherein secondary processor 204 itself is awake, but peripherals are quiesced.

At step 926, main processor 202 may determine whether secondary processor 204 has processed the data in mailbox register 206. For example, after sending the command, main processor 202 may poll on ack GPIO 208 to detect the low signal on ack. When low is detected, in main processor 202 may continue sleep processing. If low is not detected, main processor 202 may initiate recovery of secondary processor 204, for example by restarting secondary processor 204 sleep process.

As part of continued sleep processing, at step 928, main processor 202 may suspend link 210. For example, main processor 202 may power down system 100 USB resources, causing link 210 to become inactive. Accordingly, main processor 202 and secondary processor 204 may be restricted to communication using GPIO 208 for the remainder of the sleep process 900. After sleep processing, main processor 202 may enter sleep state.

Figure 10:
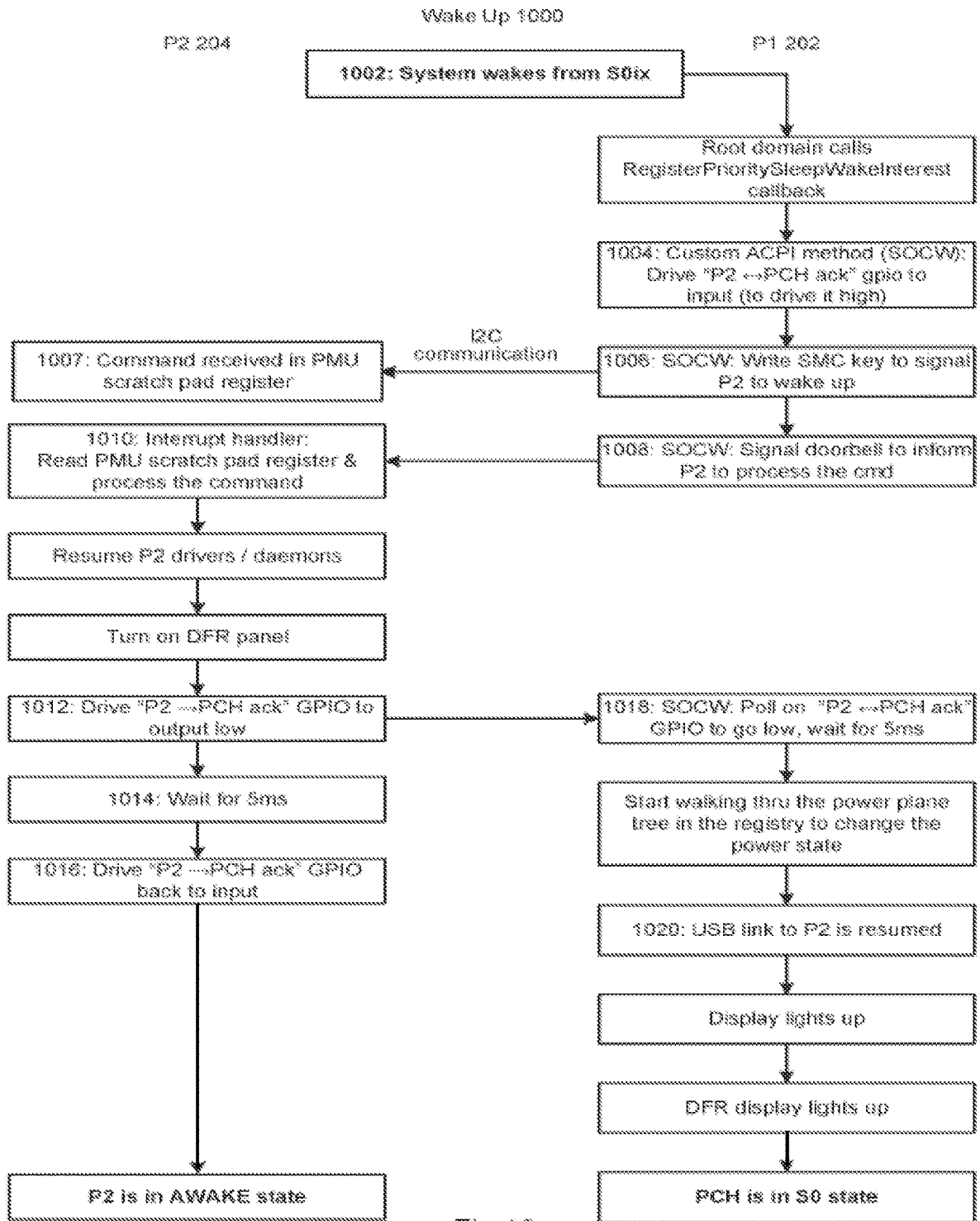
FIG. 10 shows an example wake up process.

FIG. 10 shows an example wake up process 1000. Detailed wake up processing steps are shown in FIG. 10, but for clarity, only certain steps relevant to wake up coordination are discussed in detail herein. However, some steps not highlighted herein may also be relevant to wake up coordination, for example by turning on devices or enabling processes used in wake up coordination.

At step 1002, device 100 may wake up from sleep. For a user input made through an input device, such as a movement or click of a mouse or trackpad or an input to a keyboard, may trigger wakeup. Main processor 202 may begin leave standby processing, for example by notifying device 100 applications/processes of wakeup.

At step 1004, main processor 202 may configure ack GPIO 208. For example, main processor 202 may drive main processor 202 ack GPIO 208 pin to high. Specifically, secondary processor 204 may acknowledge command processing by driving ack GPIO 208 low. Accordingly, by driving ack GPIO 208 high, main processor 202 can detect the change on ack GPIO 208 pin when secondary processor 204 drives ack GPIO 208 low.

At step 1006, main processor 202 may use $I^2C$ bus 209 to place a command in the mailbox register 206 of secondary processor 204. For example, the command may include an SMC key signaling secondary processor 204 to wake up.

At step 1007, secondary processor 204 may receive the command in mailbox register 206.

At step 1008, main processor 202 may use GPIO 208 to wiggle doorbell to wake secondary processor 204, using mailbox processing 300 described above. For example, main processor 202 may drive doorbell GPIO 208 high, triggering an interrupt in secondary processor 204. The interrupt may cause secondary processor 204 to exit quiesce mode.

At step 1008, secondary processor 204 may process the command in mailbox register 206. For example, in response to the interrupt, secondary processor 204 may read the mailbox register 206, loading commands therein into secondary processor 204 memory for processing. In this case, secondary processor 204 may resume normal operating mode by resuming drivers/daemons and turning on hardware under secondary processor 204 control (e.g., DFR 112). Thereafter, secondary processor 204 may be awake.

After processing the command, at step 1012, secondary processor 204 may acknowledge awakening. For example, secondary processor 204 may drive ack GPIO 208 low upon secondary processor 204 standby processing completion, telling main processor 202 that wake up processing was successful.

At step 1014, secondary processor 204 may wait for a period of time.

At step 1016, secondary processor 204 may restore ack GPIO 208 to a state of readiness for processing future mailbox communications according to process 300. For example, after waiting, secondary processor 204 may reset secondary processor 204 ack GPIO 208 pin back to input.

At step 1018, main processor 202 may determine whether secondary processor 204 has processed the data in mailbox register 206. For example, after sending the command, main processor 202 may poll on ack GPIO 208 to detect the low signal on ack. When low is detected, in main processor 202 may continue wake up processing. If low is not detected, main processor 202 may initiate recovery of secondary processor 204, for example by restarting secondary processor 204 wake up process. First processor may continue wake up processing.

As part of continued wake up processing, at step 1020, main processor 202 may resume link 210. For example, main processor 202 may restore system 100 USB power, reactivating link 210. Accordingly, main processor 202 and secondary processor 204 may be able to communicate using link 210 in normal mode. Thereafter, main processor 202 may be awake.

Graphical User Interfaces

This disclosure above describes various GUIs for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Example System Architecture

Figure 11:
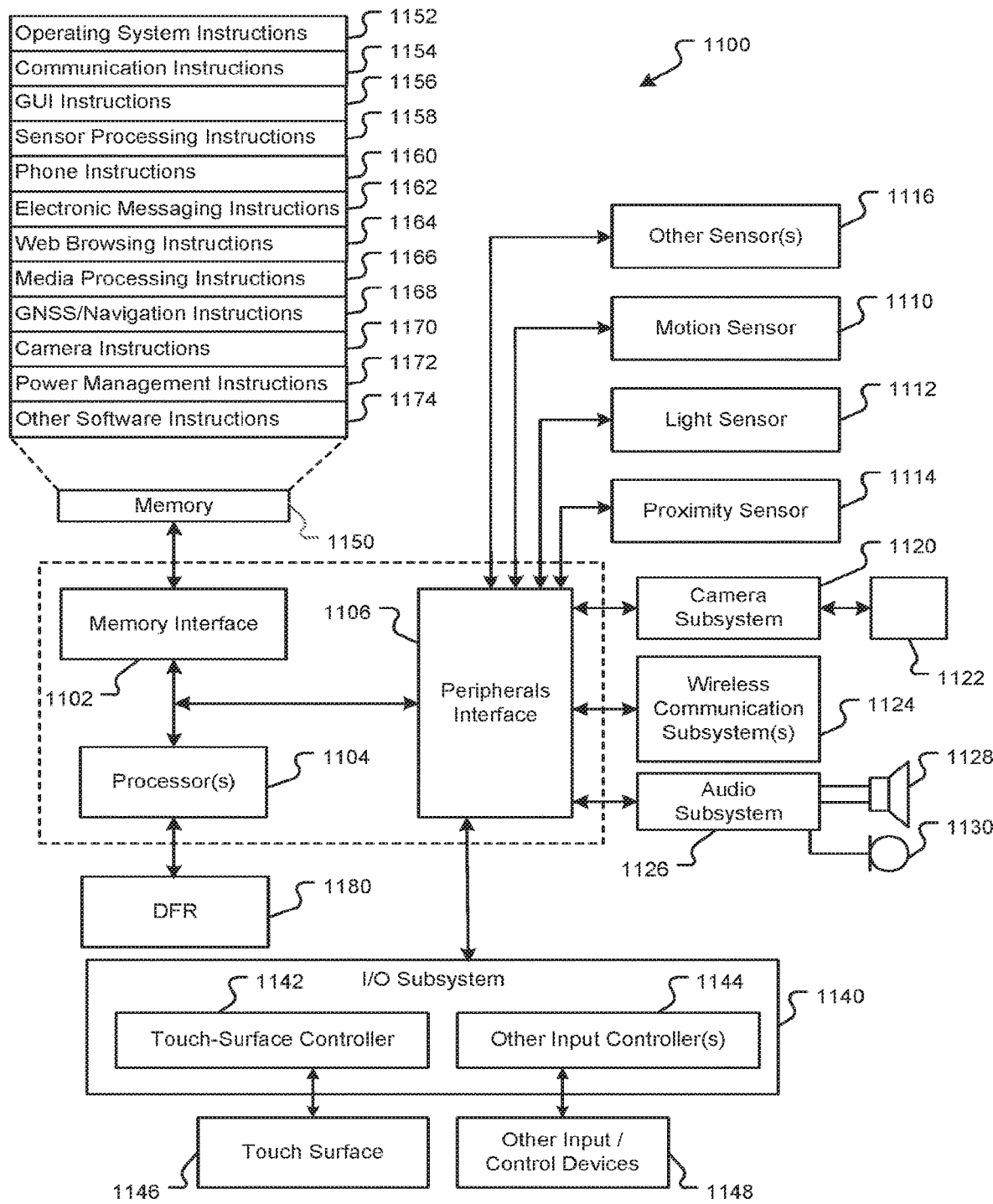
FIG. 11 is a block diagram of an example system architecture implementing the features and processes of FIGS. 1-10

FIG. 11 is a block diagram of an example computing device 1100 that can implement the features and processes of FIGS. 1-10. The computing device 1100 can include a memory interface 1102, one or more data processors, image processors and/or central processing units 1104, and a peripherals interface 1106. For example, the one or more processors 1104 may include main processor 202 and secondary processor 204. The memory interface 1102, the one or more processors 1104 and/or the peripherals interface 1106 can be separate components or can be integrated in one or more integrated circuits. The various components in the computing device 1100 can be coupled by one or more communication buses or signal lines.

Sensors, devices, and subsystems can be coupled to the peripherals interface 1106 to facilitate multiple functionalities. For example, a motion sensor 1110, a light sensor 1112, and a proximity sensor 1114 can be coupled to the peripherals interface 1106 to facilitate orientation, lighting, and proximity functions. Other sensors 1116 can also be connected to the peripherals interface 1106, such as a global navigation satellite system (GNSS) (e.g., GPS receiver), a temperature sensor, a biometric sensor, magnetometer or other sensing device, to facilitate related functionalities.

A camera subsystem 1120 and an optical sensor 1122, e.g., a charged coupled device (CCD) or a complementary metal-oxide semiconductor (CMOS) optical sensor, can be utilized to facilitate camera functions, such as recording photographs and video clips. The camera subsystem 1120 and the optical sensor 1122 can be used to collect images of a user to be used during authentication of a user, e.g., by performing facial recognition analysis.

Communication functions can be facilitated through one or more wireless communication subsystems 1124, which can include radio frequency receivers and transmitters and/or optical (e.g., infrared) receivers and transmitters. The specific design and implementation of the communication subsystem 1124 can depend on the communication network(s) over which the computing device 1100 is intended to operate. For example, the computing device 1100 can include communication subsystems 1124 designed to operate over a GSM network, a GPRS network, an EDGE network, a Wi-Fi or WiMax network, and a Bluetooth™ network. In particular, the wireless communication subsystems 1124 can include hosting protocols such that the device 100 can be configured as a base station for other wireless devices.

An audio subsystem 1126 can be coupled to a speaker 1128 and a microphone 1130 to facilitate voice-enabled functions, such as speaker recognition, voice replication, digital recording, and telephony functions. The audio subsystem 1126 can be configured to facilitate processing voice commands, voiceprinting and voice authentication, for example.

The I/O subsystem 1140 can include a touch-surface controller 1142 and/or other input controller(s) 1144. The touch-surface controller 1142 can be coupled to a touch surface 1146. The touch surface 1146 and touch-surface controller 1142 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 1146.

The other input controller(s) 1144 can be coupled to other input/control devices 1148, such as one or more buttons, rocker switches, thumb-wheel, infrared port, USB port, and/or a pointer device such as a stylus. The one or more buttons (not shown) can include an up/down button for volume control of the speaker 1128 and/or the microphone 1130.

In one implementation, a pressing of the button for a first duration can disengage a lock of the touch surface 1146; and a pressing of the button for a second duration that is longer than the first duration can turn power to the computing device 1100 on or off. Pressing the button for a third duration can activate a voice control, or voice command, module that enables the user to speak commands into the microphone 1130 to cause the device to execute the spoken command. The user can customize a functionality of one or more of the buttons. The touch surface 1146 can, for example, also be used to implement virtual or soft buttons and/or a keyboard.

The computing device 1100 can include a DFR 1180. DFR 1180 may include a touch sensitive display, display controller, touch input controller, and/or other hardware configured to display a GUI and receive commands from user interaction with the GUI.

In some implementations, the computing device 1100 can present recorded audio and/or video files, such as MP3, AAC, and MPEG files. In some implementations, the computing device 1100 can include the functionality of an MP3 player, such as an iPod™. The computing device 1100 can, therefore, include a 36-pin connector that is compatible with the iPod. Other input/output and control devices can also be used.

The memory interface 1102 can be coupled to memory 1150. The memory 1150 can include high-speed random access memory and/or non-volatile memory, such as one or more magnetic disk storage devices, one or more optical storage devices, and/or flash memory (e.g., NAND. NOR). The memory 1150 can store an operating system 1152, such as Darwin. RTXC, LINUX, UNIX, OS X. WINDOWS, or an embedded operating system such as VxWorks.

The operating system 1152 can include instructions for handling basic system services and for performing hardware dependent tasks. In some implementations, the operating system 1152 can be a kernel (e.g., UNIX kernel). In some implementations, the operating system 1152 can include instructions for performing voice authentication. For example, operating system 1152 can implement the DFR features as described with reference to FIGS. 1-10.

The memory 1150 can also store communication instructions 1154 to facilitate communicating with one or more additional devices, one or more computers and/or one or more servers. The memory 1150 can include graphical user interface instructions 1156 to facilitate graphic user interface processing; sensor processing instructions 1158 to facilitate sensor-related processing and functions; phone instructions 1160 to facilitate phone-related processes and functions; electronic messaging instructions 1162 to facilitate electronic-messaging related processes and functions; web browsing instructions 1164 to facilitate web browsing-related processes and functions; media processing instructions 1166 to facilitate media processing-related processes and functions; GNSS/Navigation instructions 1168 to facilitate GNSS and navigation-related processes and instructions; and/or camera instructions 1170 to facilitate camera-related processes and functions.

The memory 1150 can store power management instructions 1172 to facilitate other processes and functions, such as the booting and power management processes and functions as described with reference to FIGS. 1-10.

The memory 1150 can also store other software instructions 1174, such as web video instructions to facilitate web video-related processes and functions; and/or web shopping instructions to facilitate web shopping-related processes and functions. In some implementations, the media processing instructions 1166 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 1150 can include additional instructions or fewer instructions. Furthermore, various functions of the computing device 1100 can be implemented in hardware and/or in software, including in one or more signal processing and/or application specific integrated circuits.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method for coordinating operations between a first processor and a second processor in a device, comprising:
    initiating, by the first processor, a process transitioning the first processor from a first state to a second state;
    notifying, by the first processor, the second processor of the process upon reaching a predetermined step in the process;
    in response to the notifying: initiating, by the second processor, a parallel process transitioning the second processor from a third state to a fourth state, the third state being equivalent to the first state and the fourth state being equivalent to the second state, wherein the parallel process enables or disables use of a dynamic function row (DFR) of the device; and
    waiting, by the first processor, for a status of the second processor to satisfy a predefined condition before continuing the process on the first processor.

2. The method as recited in claim 1, wherein the process is one of: a shutdown process, a warm reboot process, an enter sleep process, a wakeup process, an enter standby process, or a leave standby process.

3. The method as recited in claim 1, wherein the first processor is a central processing unit (CPU), and wherein the second processor utilizes a security processor to provide a secure mailbox register for the CPU.

4. The method as recited in claim 3, wherein the CPU notifies the second processor of the process via an inter-integrated circuit (I²C) bus connection to the secure mailbox register of the security processor.

5. The method as recited in claim 3, wherein the security processor is further configured to initialize general purpose input/output (GPIO) paths between the CPU and the second processor.

6. The method as recited in claim 5, wherein the CPU notifies the second processor of the process via a first GPIO pin at the security processor, and wherein the second processor is configured to send acknowledgement messages to the CPU via a second GPIO pin at the CPU.

7. The method as recited in claim 5, wherein the GPIO paths comprise:
    a first logical path configured to transfer alerts from the CPU to the second processor indicating one or more commands being present in the secure mailbox register; and
    a second logical path configured to transfer acknowledgements from the second processor to the CPU.

8. A system for coordinating operations between a first processor and a second processor in a device, the system comprising:
    at least one processor; and
    a non-transitory computer-readable medium storing instructions that cause the at least one processor to perform operations comprising:
        initiating, by the first processor, a process transitioning the first processor from a first state to a second state;
        notifying, by the first processor, the second processor of the process upon reaching a predetermined step in the process;
        in response to the notifying: initiating, by the second processor, a parallel process transitioning the second processor from a third state to a fourth state, the third state being equivalent to the first state and the fourth state being equivalent to the second state, wherein the parallel process enables or disables use of a dynamic function row (DFR) of the device; and
        waiting, by the first processor, for a status of the second processor to satisfy a predefined condition before continuing the process on the first processor.

9. The system as recited in claim 8, wherein the process is one of: a shutdown process, a warm reboot process, an enter sleep process, a wakeup process, an enter standby process, or a leave standby process.

10. The system as recited in claim 8, wherein the first processor is a central processing unit (CPU), and wherein the second processor utilizes a security processor to provide a secure mailbox register for the CPU.

11. The system as recited in claim 10, wherein the CPU notifies the second processor of the process via an inter-integrated circuit (I²C) bus connection to the secure mailbox register of the security processor.

12. The system as recited in claim 10, wherein the security processor is further configured to initialize general purpose input/output (GPIO) paths between the CPU and the second processor.

13. The system as recited in claim 12, wherein the CPU notifies the second processor of the process via a first GPIO pin at the security processor, and wherein the second processor is configured to send acknowledgement messages to the CPU via a second GPIO pin at the CPU.

14. The system as recited in claim 12, wherein the GPIO paths comprise:
- a first logical path configured to transfer alerts from the CPU to the second processor indicating one or more commands being present in the secure mailbox register; and
- a second logical path configured to transfer acknowledgements from the second processor to the CPU.

15. A non-transitory computer-readable medium for coordinating operations between a first processor and a second processor in a device, the non-transitory computer-readable medium storing instructions that cause at least one processor to perform operations comprising:
- initiating, by the first processor, a process transitioning the first processor from a first state to a second state;
- notifying, by the first processor, the second processor of the process upon reaching a predetermined step in the process;
- in response to the notifying: initiating, by the second processor, a parallel process transitioning the second processor from a third state to a fourth state, the third state being equivalent to the first state and the fourth state being to an equivalent to the second state, wherein the parallel process enables or disables use of a dynamic function row (DFR) of the device; and
- waiting, by the first processor, for a status of the second processor to satisfy a predefined condition before continuing the process on the first processor.

16. The non-transitory computer-readable medium as recited in claim 15, wherein the process is one of: a shutdown process, a warm reboot process, an enter sleep process, a wakeup process, an enter standby process, or a leave standby process.

17. The non-transitory computer-readable medium as recited in claim 15, wherein the first processor is a central processing unit (CPU), and wherein the second processor utilizes a security processor to provide a secure mailbox register for the CPU.

18. The non-transitory computer-readable medium as recited in claim 17, wherein the security processor is further configured to initialize general purpose input/output (GPIO) paths between the CPU and the second processor.

19. The non-transitory computer-readable medium as recited in claim 18, wherein the CPU notifies the second processor of the process via a first GPIO pin at the security processor, and wherein the second processor is configured to send acknowledgement messages to the CPU via a second GPIO pin at the CPU.

20. The non-transitory computer-readable medium as recited in claim 18, wherein the GPIO paths comprise:
- a first logical path configured to transfer alerts from the CPU to the second processor indicating one or more commands being present in the secure mailbox register; and
- a second logical path configured to transfer acknowledgements from the second processor to the CPU.

* * * * *